(12) United States Patent
Schonberg et al.

(10) Patent No.: US 8,275,209 B2
(45) Date of Patent: Sep. 25, 2012

(54) REDUCED DC GAIN MISMATCH AND DC LEAKAGE IN OVERLAP TRANSFORM PROCESSING

(75) Inventors: Daniel Schonberg, Seattle, WA (US); Shankar L. Regunathan, Bellevue, WA (US); Shijun Sun, Redmond, WA (US); Gary J. Sullivan, Redmond, WA (US); Zhi Zhou, Issaquah, WA (US); Sridhar Srinivasan, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 12/571,365

(22) Filed: Sep. 30, 2009

(65) Prior Publication Data

US 2010/0092098 A1 Apr. 15, 2010

Related U.S. Application Data

(60) Provisional application No. 61/104,668, filed on Oct. 10, 2008.

(51) Int. Cl.
*G06K 9/36* (2006.01)

(52) U.S. Cl. ......... 382/233; 382/232; 382/239; 382/248

(58) Field of Classification Search ............... 382/232, 382/233, 239, 248; 348/450; 704/208, 230, 704/265; 708/401; 375/240.21, 240.15, 375/240.18, E7.193
See application file for complete search history.

(56) References Cited

U.S. PATENT DOCUMENTS

| | | |
|---|---|---|
| 4,698,672 A | 10/1987 | Chen et al. |
| 4,754,492 A | 6/1988 | Malvar |
| 5,297,236 A | 3/1994 | Antill et al. |
| 5,311,310 A | 5/1994 | Jozawa et al. |
| 5,384,849 A | 1/1995 | Jeong |
| 5,805,739 A | 9/1998 | Malvar et al. |
| 5,822,000 A | 10/1998 | Yoon |
| 5,850,294 A | 12/1998 | Apostolopoulos et al. |
| 5,859,788 A | 1/1999 | Hou |
| 5,933,522 A | 8/1999 | Sugimoto |
| 5,933,541 A | 8/1999 | Kutka et al. |
| 5,970,173 A | 10/1999 | Lee et al. |
| 5,973,755 A | 10/1999 | Gabriel |
| 5,982,459 A | 11/1999 | Fandrianto et al. |

(Continued)

FOREIGN PATENT DOCUMENTS

AU 7351001 1/2002

(Continued)

OTHER PUBLICATIONS

U.S. Appl. No. 60/341,674, filed Dec. 17, 2001, Lee et al.

(Continued)

*Primary Examiner* — Anh Hong Do
(74) *Attorney, Agent, or Firm* — Klarquist Sparkman, LLP

(57) ABSTRACT

In certain embodiments, overlap operators are applied during encoding and/or decoding of digital media, where the overlap operators have reduced DC gain mismatch and/or DC leakage between interior overlap operators and overlap operators at the edge and/or corner. In other embodiments, information indicating a selected tile boundary option for overlap processing can be encoded and/or decoded. The selected tile boundary option indicates one of a hard tile boundary option and a soft tile boundary option for processing with overlap operators. Overlap transform processing can then be applied based at least in part on the selected tile boundary option.

20 Claims, 8 Drawing Sheets

U.S. PATENT DOCUMENTS

| | | | |
|---|---|---|---|
| 5,999,656 A | 12/1999 | Zandi et al. | |
| 6,011,625 A | 1/2000 | Glass | |
| 6,029,126 A | 2/2000 | Malvar | |
| 6,064,776 A | 5/2000 | Kikuchi et al. | |
| 6,073,153 A | 6/2000 | Malvar | |
| 6,101,279 A | 8/2000 | Nguyen et al. | |
| 6,115,689 A | 9/2000 | Malvar | |
| 6,154,762 A | 11/2000 | Malvar | |
| 6,219,458 B1 | 4/2001 | Zandi et al. | |
| 6,249,610 B1 | 6/2001 | Matsumoto et al. | |
| 6,253,165 B1 | 6/2001 | Malvar | |
| 6,307,887 B1 | 10/2001 | Gabriel | |
| 6,324,560 B1 | 11/2001 | Malvar | |
| 6,337,881 B1 | 1/2002 | Chaddha | |
| 6,370,502 B1 | 4/2002 | Wu et al. | |
| 6,377,916 B1 * | 4/2002 | Hardwick ................ | 704/208 |
| 6,393,061 B1 | 5/2002 | Owechko | |
| 6,393,156 B1 | 5/2002 | Nguyen et al. | |
| 6,421,464 B1 | 7/2002 | Tran et al. | |
| 6,487,574 B1 | 11/2002 | Malvar | |
| 6,496,795 B1 | 12/2002 | Malvar | |
| 6,728,315 B2 | 4/2004 | Haskell et al. | |
| 6,728,316 B2 | 4/2004 | Enficiaud et al. | |
| 6,763,068 B2 | 7/2004 | Oktem | |
| 6,771,828 B1 | 8/2004 | Malvar | |
| 6,771,829 B1 | 8/2004 | Topiwala et al. | |
| 6,832,232 B1 | 12/2004 | Hus et al. | |
| 6,865,229 B1 | 3/2005 | Pronkine | |
| 7,006,699 B2 | 2/2006 | Malvar | |
| 7,027,654 B1 | 4/2006 | Ameres et al. | |
| 7,050,504 B2 | 5/2006 | Joch et al. | |
| 7,106,797 B2 | 9/2006 | Malvar | |
| 7,110,610 B2 | 9/2006 | Malvar | |
| 7,116,834 B2 | 10/2006 | Malvar | |
| 7,120,297 B2 | 10/2006 | Simard | |
| 7,155,065 B1 | 12/2006 | Malvar | |
| 7,167,522 B2 | 1/2007 | Webb | |
| 7,181,403 B2 | 2/2007 | Wu et al. | |
| 7,275,036 B2 | 9/2007 | Geiger et al. | |
| 7,305,139 B2 | 12/2007 | Srinivasan et al. | |
| 7,315,822 B2 | 1/2008 | Li | |
| 7,376,266 B2 | 5/2008 | Simard | |
| 7,412,102 B2 | 8/2008 | Srinivasan | |
| 7,428,342 B2 | 9/2008 | Tu et al. | |
| 7,460,993 B2 | 12/2008 | Chen et al. | |
| 7,471,726 B2 | 12/2008 | Srinivasan | |
| 7,471,850 B2 | 12/2008 | Srinivasan | |
| 7,551,789 B2 | 6/2009 | Tu et al. | |
| 2002/0110280 A1 | 8/2002 | Prakash et al. | |
| 2002/0118748 A1 | 8/2002 | Inomata et al. | |
| 2002/0118759 A1 | 8/2002 | Enficiaud et al. | |
| 2003/0128756 A1 | 7/2003 | Oktem | |
| 2003/0152146 A1 | 8/2003 | Lin | |
| 2003/0185439 A1 | 10/2003 | Malvar | |
| 2003/0187634 A1 | 10/2003 | Li | |
| 2003/0206582 A1 | 11/2003 | Srinivasan | |
| 2004/0047512 A1 | 3/2004 | Handley et al. | |
| 2004/0057631 A1 | 3/2004 | Kim | |
| 2004/0167757 A1 | 8/2004 | Struijs | |
| 2004/0170302 A1 | 9/2004 | Museth et al. | |
| 2005/0013359 A1 | 1/2005 | Srinivasan | |
| 2005/0083216 A1 | 4/2005 | Lin | |
| 2005/0231396 A1 | 10/2005 | Dunn | |
| 2005/0286795 A1 | 12/2005 | Zhang | |
| 2006/0114993 A1 | 6/2006 | Xiong et al. | |
| 2006/0133682 A1 | 6/2006 | Tu et al. | |
| 2006/0133684 A1 | 6/2006 | Srinivasan et al. | |
| 2006/0291734 A1 | 12/2006 | Hou | |
| 2006/0291735 A1 | 12/2006 | Hou | |
| 2006/0291736 A1 | 12/2006 | Hou | |
| 2006/0293881 A1 | 12/2006 | Hou | |
| 2007/0036224 A1 | 2/2007 | Srinivasan | |
| 2008/0075377 A1 | 3/2008 | Topiwala et al. | |
| 2008/0137982 A1 | 6/2008 | Nakajima | |
| 2008/0198936 A1 | 8/2008 | Srinivasan | |
| 2009/0299754 A1 | 12/2009 | Mehrotra | |

FOREIGN PATENT DOCUMENTS

| | | |
|---|---|---|
| EP | 0467054 | 8/1996 |
| EP | 1202219 | 5/2002 |
| EP | 1 672 929 | 6/2006 |
| JP | 05-083141 | 4/1993 |
| JP | 5-091459 | 4/1993 |
| JP | 6-290262 | 10/1994 |
| JP | 11-088701 | 3/1999 |
| JP | 11-203271 | 7/1999 |
| JP | 2002-182693 | 6/2002 |
| JP | 2002-304624 | 10/2002 |
| JP | 2003-283840 | 10/2003 |
| JP | 2003-298846 | 10/2003 |
| JP | 2003-324757 | 11/2003 |
| JP | 2004-201047 | 7/2004 |
| KR | 10-2004-0050888 | 6/2004 |
| KR | 10-2006-0083125 | 7/2006 |
| KR | 10-2006-0092826 | 8/2006 |
| KR | 10-0676226 | 1/2007 |
| RU | 2194361 | 12/2002 |
| WO | WO 02/07438 | 1/2002 |
| WO | WO 03/038752 | 5/2003 |
| WO | WO 03/053066 | 6/2003 |
| WO | WO 2007/021615 | 2/2007 |
| WO | WO 2008/057308 | 5/2008 |

OTHER PUBLICATIONS

U.S. Appl. No. 60/488,710, filed Jul. 18, 2003, Srinivasan et al.

Adams, "Generalized Reversible Integer-to-Integer Transform Framework," 2003 IEEE Pacific Rim Conference on Communications, Computers, and Signal Processing, vol. 2, Aug. 2003, pp. 1000-1003.

Ahmed et al., "Discrete Cosine Transform," *IEEE Transactions on Computers*, C-23 (Jan. 1974), pp. 90-93.

Apostolopoulos et al., "Post-processing for very low bit-rate video compression," *IEEE Trans. Image Processing*, vol. 8, pp. 1125-1129 (Aug. 1999).

Arai et al., "A Fast DCT-SQ Scheme for Images," The Trans. of the IEICE, vol. E 71, No. 11, pp. 1095-1097 (Nov. 1988).

Bhaskaran et al., "Image and Video Compression Standards Algorithms and Architectures," 2nd ed., 1997, pp. 192-194.

Cham, "Development of integer cosine transforms by the principle of dyadic symmetry," IEE Proc., vol. 136, Pt. 1, No. 4, pp. 276-282 (Aug. 1989).

Chen et al., "A Fast Computational Algorithm for the Discrete Cosine Transform," IEEE Trans. on Communications, vol. COM-25, No. 9, pp. 1004-1009 (Sep. 1977).

Chen et al., "Integer Reversible Transformation to Make JPEG Lossless," IEEE Int'l Conf. on Signal Processing, vol. 1, pp. 835-838 (Aug. 2004).

Chen et al., "M-Channel Lifting Factorization of Perfect Reconstruction Filter Banks and Reversible M-Band Wavelet Transforms," IEEE Trans. on Circuits and Systems II: Analog and Digital Signal Processing, vol. 50, No. 12, pp. 963-976 (Dec. 2003).

Cheng et al., "New family of lapped biorthogonal transform via lifting steps," IEE Proc. Vision, Image and Signal Processing, vol. 149, No. 2, pp. 91-96 (Apr. 2002).

Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).

de Queiroz et al., "Lapped transforms for image compression," *The Handbook on Transforms and Data Compression*, CRC Press, pp. 197-265 (Oct. 2000).

de Queiroz et al., "Time-Varying Lapped Transforms and Wavelet Packets," *IEEE Transactions on Signal Processing*, vol. 41, No. 12, pp. 3293-3305 (1993).

Fukuma et al., "Lossless 8-point fast discrete cosine transform using lossless hadamard transform," Technical Report of IEICE, vol. 99, No. 399, pp. 37-44 (Oct. 29, 1999).

Gangaputra et al., "Adaptive Pre- and Post-Filtering for Block Based Systems," IEEE Int'l Conf. on Acoustics, Speech, and Signal Processing, vol. 4, pp. IV-3297 through IV-3300 (May 2002).

Geiger et al., "IntMDCT—A Link Between Perceptual and Lossless Audio Coding," IEEE Int'l Conf. on Acoustics, Speech, and Signal Processing, vol. 2, 4 pp (May 2002).

Goel et al., "Pre-processing for MPEG Compression Using Adaptive Spatial Filtering," *Proceedings of 1995 IEEE International Conference on Consumer Electronics*, 1995, pp. 246-247.

"H.264 & IPTV Over DSL—Enabling New Telco Revenue Opportunities," *White Paper*, Intel/Envivio, available at http://www.envivio.com/images/products/H264whitepaper.pdf (May 15, 2004), 12 pp.

Hao et al., "Comparative Study of Color Transforms for Image Coding and Derivation of Integer Reversible Color Transform," IEEE Int'l Conf. on Pattern Recognition, vol. 3, pp. 224-227 (Sep. 2000).

Hao et al., "Matrix Factorizations for Reversible Integer Mapping," IEEE Transactions on Signal Processing, vol. 49, Issue 10, Oct. 2001, pp. 2314-2324.

Hohl, "An 8×8 Discrete Cosine Transform Implementation on the TMS320C25 or the TMS320C30," Texas Instruments Application Report SPRA115, pp. 1-25 (1990) http://focus.ti.com/lit/an/spra115/spra115/pdf [Downloaded from the World Wide Web on Dec. 28, 2005].

Hui et al., "An Integer Hierarchy Lapped Biorthogonal Transform via Lifting Steps and Application in Image Coding," IEEE Int'l Conf. on Signal Processing, vol. 1, pp. 664-667 (Aug. 2002).

Intel Corporation, "Using Streaming SIMD Extensions in a Fast DCT Algorithm for MPEG Encoding," Version 1.2, 11 pp. (Jan. 1999).

Intel Corporation, "Using MMX™ Instructions in a Fast iDCT Algorithm for MPEG Decoding," 21 pp. (Mar. 1996).

International Search Report dated Apr. 30, 2010, for International Application No. PCT/US2009/060249, filed Oct. 9, 2009, 5 pages.

ISO/IEC, "ISP/IEC 11172-2: Information Technology—Coding of Moving Pictures and Associated Audio for Storage Media at up to About 1.5 Mbit/s," 122 pp. (1993).

ISO/IEC, "Information Technology—Coding of Audio-Visual Objects: Visual, ISO/IEC 14496-2, Committee Draft," 330 pp. (1998).

ISO/IEC 14496-2, "Coding of Audio-Visual Object—Part 2: Visual," Third Edition, pp. 1-727, (Jun. 2004).

ISO/IEC JTC1/SC29/WG11 N4668, "Coding of Moving Pictures and Audio," Title: MPEG-4 Overview—(V.21—Jeju Version), Editor: Rob Koenen (rob.koenen@m4if.org), available at http://www.chiariglione.org/mpeg/standards/mpeg-4/mpeg-4.htm (Mar. 2002), 66 pp.

ISO/IEC, "An integer reversible color transform," ISO/IEC JTC1/SC29/WG1 N1479, 6 pp. (Nov. 1999).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

ITU-T Recommendation H.264, "Series H: Audiovisual and Multimedia Systems, Infrastructure of Audiovisual Services—Coding of Moving Video," International Telecommunication Union, pp. 1-262 (May 2003).

ITU-T Recommendation T.800, "Series T: Terminals for Telematic Services," International Telecommunication Union, pp. 1-194 (Aug. 2002).

Jain, "Fundamentals of Digital Image Processing," Chapters 2, 5, and 11, Prentice Hall, 189 pp. (1989).

Joint Video Team (JVT) of ISO/IEC MPEG & ITU-T VCEG, "Joint Final Committee Draft (JFCD) of Joint Video Specification," JVT-D157, 207 pp. (Aug. 2002).

Joint Video Team (JVT) of ISO/IEC MPEG & ITU-T VCEG, "New Invertible Integer Color Transforms Based on Lifting Steps and Coding of 4:4:4 Video," JVT-I015r3, 16 pp. (Sep. 2003).

Kim et al., "A New Color Transform for RGB Coding," Int'l Conf. on Image Processing, pp. 107-110 (Oct. 2004).

Klausutis et al., "Variable Block Size Adaptive Lapped Transform-based Image Coding," *1997 International Conference on Image Processing (ICIP '97)*, vol. 3, pp. 686-689 (1997).

Li, "Low Noise Reversible MDCT (RMDCT) and Its Application in Progressive-to-Lossless Embedded Audio Coding," IEEE Trans. on Signal Processing, vol. 53, No. 5 (May 2005).

List et al., "Adaptive deblocking filter," IEEE Trans. on Circuits and Systems for Video Technology, vol. 13, No. 7, pp. 614-619 (Jul. 2003).

Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).

Malvar, "Extended Lapped Transforms: Fast Algorithms and Applications," ICASSP, vol. 3, pp. 1797-1800, Apr. 14-17, 1991.

Malvar, "Fast Progressive Image Coding without Wavelets", IEEE Data Compression Conference, Snowbird, Utah, 10 pp. (Mar. 2000).

Malvar, "Lapped Biorthogonal Transforms for Transform Coding with Reduced Blocking and Ringing Artifacts," IEEE Int'l Conf. on Acoustics, Speech, and Signal Processing, vol. 3, pp. 2421-2424 (Apr. 1997).

Malvar, "Lapped Transforms for Efficient Transform/Subband Coding," *IEEE Transactions on Acoustics, Speech and Signal Processing*, vol. 38, No. 6, pp. 969-978 (1990).

Malvar, "Signal Processing With Lapped Transforms," Norwood, MA: Artech House, pp. 175-219 (1992).

Malvar, "Signal Processing with Lapped Transforms," pp. 143-173 and 265-273 (1992).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Muramatsu et al., "The two-dimensional lapped Hadamard transform," IEEE Proc. on Circuits and Systems, vol. 5, pp. 86-89 (May 1998).

Murata et al., "Fast 2D IDCT Implementation with Multimedia Instructions for a Software MPEG2 Decoder," IEEE Conf. Acoustics, Speech and Signal Processing, vol. 5, 4 pp. (May 1998).

Ostermann et al., "Video Coding with H.264/AVC", IEEE Circuits and Systems Magazine, First Quarter 2004 (retrieved on Apr. 14, 2007), retrieved from the internet URL:http://ieeexplore.ieee.org, 22 pp.

Paeth, "A Fast Algorithm for General Raster Rotation," *Proceedings of Graphics Interface '86*, pp. 77-81, May 1986.

Park et al., "A post processing method for reducing quantization effects in low bit-rate moving picture coding," *IEEE Trans. Circuits Syst.*, Video Technol., vol. 9, pp. 161-171 (Feb. 1999).

Printouts of FTP directories from http://ftp3.itu.ch, 8 pp. (downloaded from the World Wide Web on Sep. 20, 2005), 8 pp.

Proposed SMPTE Standard for Television: VC-1 Compressed Video Bitstream Format and Decoding Process, pp. 1-500, (Aug. 2005).

Rao et al., "Techniques and Standards for Image, Video, and Audio Coding," Englewood Cliffs, NJ: Prentice-Hall (1996), 21 pp.

Reader, "History of MPEG Video Compression—Ver. 4.0," 99 pp. (document marked Dec. 16, 2003).

Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).

Shui et al., "M-Band Biorthogonal Interpolating Wavelets via Lifting Scheme," IEEE Trans. on Signal Processing, vol. 52, No. 9, pp. 2500-2512 (Sep. 2004).

Srinivasan, "Modulo Transforms an Alternative to Lifting," MSR-TR-2004-130, 29 pp. (document marked Jan. 10, 2005).

Srinivasan, "Reversible Image Rotations with Modulo Transforms," IEEE Image Processing, vol. 2, pp. 137-140 (Sep. 2005).

Srinivasan et al., "Windows Media Video 9: overview and applications," Signal Processing Image Communication, vol. 19, No. 9, pp. 851-875 (Oct. 2004).

Tanaka et al., "A Rotation Method for Raster Image Using Skew Transformation," *Proc IEEE Conf on Computer Vision and Pattern Recognition*, pp. 272-277, Jun. 1986.

Tran et al., "Lapped Transform Based Video Coding," *Proc. SPIE Applicat. Digital Image Processing XXIV*, San Diego, CA, pp. 319-333 (Aug. 2001).

Tran, "Lapped Transform via Time-Domain Pre- and Post-Processing," *2001 Conference on Information Sciences and Systems*, The Johns Hopkins University (Mar. 21-23, 2001), 6 pp.

Tran et al., "Lapped Transform via Time-Domain Pre- and Post-Filtering," *IEEE Transactions on Signal Processing*, vol. 51, No. 6, pp. 1557-1571 (Jun. 2003).

Tran et al., "Regularity-constrained pre- and post-filtering for block DCT-based systems," IEEE Trans. on Signal Processing, vol. 51, No. 10, pp. 2568-2581 (Oct. 2003).

Tu et al., "Context-Based Entropy Coding of Block Transform Coefficients for Image Processing," *IEEE Transactions on Image Processing*, vol. 11, No. 11, pp. 1271-1283 (Nov. 2002).

Wang et al., "Interlace Coding Tools for H.26L Video Coding," ITU, VCEG-O37, 20 pp. (Nov. 2001).

Wien, "Variable Block-Size Transforms for H.264/AVC," IEEE Trans. on Circuits and Systems for Video Technology, vol. 13, No. 7, pp. 604-613 (Jul. 2003).

Wien, "Variable Block-Size Transforms for Hybrid Video Coding," Dissertation, 182 pp. (Feb. 2004).

Groder, "Modeling and Synthesis of the HD Photo Compression Algorithm," <http://hdl.handle.net/1850/7118>, Dept. of Computer Engineering, Rochester Institute of Technology, 115 pages (Aug. 2008).

De Queiroz et al., "A Fast Lapped Transform for Image Coding," *Proc. IS&T/SPIE Symp. on Electronic Imaging, Image and Video Communications and Processing*, 9 pages (Jan. 2000).

Tu et al., "Context-Based Entropy Coding of Block Transform Coefficients for Image Compression," *IEEE Transactions on Image Processing*, vol. 11(11), pp. 1271-1283 (Nov. 2002).

European Search Report dated May 9, 2012, for Application No. 09 819 990.4, 11 pages.

Srinivasan et al., "HD Photo: a new image coding technology for digital photography," Proceedings of SPIE, vol. 6696, pp. 66960A-66960A-19, Jan. 1, 2007.

Kwan et al., "A Complete Image Compression Scheme Based on Overlapped Block Transform with Post-Processing," *EURASIP Journal on Applied Signal Processing*, vol. 2006, Article ID 10968, pp. 1-15 (Jan. 2006).

\* cited by examiner

Software 880 Implementing Encoding and/or Decoding with Multiple Tile Boundary Options for Overlap Processing and/or Overlap Operators with Reduced DC Gain Mismatch

REDUCED DC GAIN MISMATCH AND DC LEAKAGE IN OVERLAP TRANSFORM PROCESSING

CROSS REFERENCE TO RELATED APPLICATIONS

This application claims the benefit of U.S. Provisional Application No. 61/104,668, filed Oct. 10, 2008, which is incorporated by reference herein in its entirety.

BACKGROUND

Transform coding is a compression technique used in many audio, image and video compression systems. Uncompressed digital images and video are typically represented or captured as samples of picture elements or colors at locations in an image or video frame arranged in a two-dimensional (2D) grid. This is conventionally referred to as a spatial-domain representation of the image or video. For example, a typical format for a rectangular-shaped image consists of three two-dimensional arrays of 8-bit color samples. Each sample is a number representing the value of a color component at a spatial location in a grid, where each color component represents an amplitude along an axis within a color space, such as RGB, or YUV, among others. An individual sample in one of these arrays may be referred to as a pixel. (In other common usage, the term pixel is used to refer to an n-tuple of n color component samples that are spatially co-located—for example, to refer to a 3-tuple grouping of the R, G, and B color component values for a given spatial location—however, the term is alternatively used here to refer to a scalar-valued sample). Various image and video systems may use different color, spatial and time resolutions of sampling. Similarly, digital audio is typically represented as time-sampled audio signal stream. For example, a typical audio format consists of a stream of 16-bit amplitude samples of an audio signal representing audio signal amplitudes at regularly-spaced time instants.

Uncompressed digital audio, image and video signals can consume considerable storage and transmission capacity. Transform coding can be used with other encoding techniques to reduce the quantity of data needed for representing such digital audio, images and video, for example, by transforming the spatial-domain (or time-domain) representation of the signal into a frequency-domain (or other like transform domain) representation, so as to enable a subsequent reduction in the quantity of data needed to represent the signal. The reduction in the quantity of data is typically accomplished by the application of a process known as quantization or by the selective discarding of certain frequency components of the transform-domain representation (or a combination of the two), followed by application of entropy encoding techniques such as adaptive Huffman encoding or adaptive arithmetic encoding. The quantization process may be applied selectively, based on the estimated degree of perceptual sensitivity of the individual frequency components or based on other criteria. For a given bit rate of output, appropriate application of transform coding generally produces much less perceptible degradation of the digital signal, as compared to reducing the color sample fidelity or spatial resolution of images or video directly in the spatial domain, or of audio in the time domain.

More specifically, a typical block transform-based coding technology divides the uncompressed pixels of the digital image into fixed-size two-dimensional blocks $(X_1, \ldots X_n)$. A linear transform that performs spatial-frequency analysis is applied to a given block, which converts the spatial-domain samples within the block to a set of frequency (or transform) coefficients generally representing the strength of the digital signal in corresponding frequency bands over the block interval. For compression, the transform coefficients may be quantized (i.e., reduced in precision, such as by dropping least significant bits of the coefficient values or otherwise mapping values in a higher precision number set to a lower precision), and also entropy or variable-length coded into a compressed data stream. At decoding, the transform coefficients will be inverse-quantized and inverse-transformed back into the spatial domain to nearly reconstruct the original color/spatial sampled image/video signal (reconstructed blocks $\hat{X}_1, \ldots \hat{X}_n$).

The ability to exploit the correlation of samples in a block and thus maximize compression capability is a major requirement in transform design. In many block transform-based coding applications, the transform should be reversible to support both lossy and lossless compression, depending on the quantization operation applied in the transform domain. With no quantization applied, for example, encoding that utilizes a reversible transform can enable the exact reproduction of the input data upon application of the corresponding decoding. However, the requirement of reversibility in these applications constrains the choice of transforms upon which the coding technology can be designed. The implementation complexity of a transform is another important design constraint. Thus, transform designs are often chosen so that the application of the forward and inverse transforms involves only multiplications by small integers and other simple mathematical operations such as additions, subtractions, and shift operations (to implement multiplication or division by a power of 2 such as 4, 8, 16, 32, etc.), so that fast integer implementations with minimal dynamic range expansion can be obtained.

Many image and video compression standards, such as JPEG (ITU-T T.81|ISO/IEC 10918-1) and MPEG-2 (ITU-T H.262|ISO/IEC 13818-2), among others, utilize transforms based on the Discrete Cosine Transform (DCT). The DCT is known to have favorable energy compaction properties but also has disadvantages in many implementations. The DCT is described by N. Ahmed, T. Natarajan, and K. R. Rao, "Discrete Cosine Transform," *IEEE Transactions on Computers*, C-23 (January 1974), pp. 90-93.

When compressing a still image (or an intra coded frame in a video sequence), many common standards such as JPEG and MPEG-2 partition the arrays representing the image into 8×8 blocks of samples and apply a block transform to each such image block. The transform coefficients in a given block in these designs are influenced only by the sample values within the block region. In image and video coding, quantization of samples in these independently-constructed blocks can result in discontinuities at block boundaries, and thus produce visually annoying artifacts known as blocking artifacts or blocking effects. Similarly for audio data, when non-overlapping blocks are independently transform coded, quantization errors will produce discontinuities in the signal at the block boundaries upon reconstruction of the audio signal at the decoder. For audio, a periodic clicking effect may be heard.

Techniques that are used to mitigate blocking artifacts include using deblocking filters to smooth the signal values across inter-block edge boundaries. These techniques are not without their flaws. For instance, deblocking techniques can require significant computational implementation resources.

Another approach is to reduce blocking effects by using a lapped transform as described in H. Malvar, "Signal Processing with Lapped Transforms," Artech House, Norwood Mass., 1992. In general, a lapped transform is a transform having an input region that spans, besides the samples in the current block, some adjacent samples in neighboring blocks. Likewise, on the reconstruction side, the inverse lapped transform influences some decoded samples in neighboring blocks as well as samples of the current block. Thus, the inverse transform can preserve continuity across block boundaries even in the presence of quantization, consequently leading to a reduction of blocking effects. Another advantage of a lapped transform is that it can exploit cross-block correlation, which yields greater compression capability. In some lapped transform implementations, overlapping blocks of samples are processed in forward and inverse transforms. In other implementations, overlap processing is separated from transform processing; for encoding, overlap processing is performed across block boundaries prior to a forward transform that is performed on non-overlapping blocks, and for decoding, inverse transforms are performed for non-overlapping blocks, and then overlap processing is performed across block boundaries.

For the case of 2D data, in general, a lapped 2D transform is a function of the current block, together with select elements of blocks to the left, above, right, below the current block, and possibly blocks to the above-left, above-right, below-left and below-right of the current block. The number of samples in neighboring blocks that are used to compute the lapped transform for the current block is referred to as the amount of overlap or support.

SUMMARY

In summary, the detailed description is directed to various technologies for digital media compression and decompression. For example, various techniques are applied which address DC gain mismatch and/or DC leakage phenomena in overlap processing operations during encoding and/or decoding.

According to one aspect of the disclosed technologies, a digital media decoding device performs an inverse overlap transform when decoding digital media. The digital media decoding device performs an inverse frequency transform on digital media. The device then applies multiple overlap operators to results of the inverse frequency transform. A first of the multiple overlap operators is an interior overlap operator, and a second of the multiple overlap operators is an edge or corner overlap operator. Each of the multiple overlap operators is characterized by substantially equivalent DC gain. This reduces DC gain mismatch between the operators.

In corresponding encoding, a digital media encoding device performs an overlap transform when encoding digital media. In pre-processing, the device applies multiple overlap operators to digital media data samples or to the results from an earlier stage of encoding of such digital media data samples. A first of the multiple overlap operators is an interior overlap operator, and a second of the multiple overlap operators is an edge or corner overlap operator. Again, each of the multiple overlap operators is characterized by substantially equivalent DC gain, which reduces DC gain mismatch between the operators, and thereby improves compression performance. The digital media encoding device performs a frequency transform on the results of the overlap pre-processing. Aside from reduced DC gain mismatch, the multiple overlap operators exhibit reduced DC leakage in many instances.

According to another aspect of the disclosed technologies, a digital media decoding device receives, in an encoded bitstream, information indicating a selected tile boundary option, where the selected tile boundary option indicates one of a hard tile boundary processing for overlap operators and a soft tile boundary processing for overlap operators. Based at least in part on the selected tile boundary option, the digital media decoding device performs inverse overlap processing. For example, the soft tile boundary processing is characterized by overlap processing across tile boundaries, and the hard tile boundary processing is characterized by the absence of such overlap processing across tile boundaries. In some implementations, the inverse overlap processing can include applying overlap operators that are designed to have reduced DC gain mismatch and/or DC leakage.

In corresponding encoding, a digital media encoding device selects between using hard tile boundary processing for overlap operators and soft tile boundary processing for overlap operators. The digital media encoding device performs overlap processing according to the selected tile boundary option. The device also signals, in an encoded bitstream, information indicating the selected tile boundary option. In some implementations, this allows for switching between a first mode (hard tiles) which typically has less compression efficiency but no dependencies between tiles, and a second mode (soft tiles) which typically has greater compression efficiency but dependencies between tiles.

The above summary is just a brief overview and is not meant to describe all features of the innovations presented herein. The foregoing and other objects, features, and advantages of the invention will become more apparent from the following detailed description, which proceeds with reference to the accompanying figures.

DETAILED DESCRIPTION

The following description relates to a digital media compression or decompression system, or encoder or decoder, which utilizes a forward/inverse overlap transform design that addresses DC gain mismatch and/or DC leakage phenomena. For purposes of illustration, an embodiment of a compression/decompression system incorporating these technologies is an image or video compression/decompression system. Alternatively, the technologies described herein can be incorporated into compression or decompression systems, or encoders or decoders, for other 2D data or other media data. The technologies described herein do not require that the digital media compression system encodes the compressed digital media data in a particular coding format.

The example implementations presented below illustrate solutions that address problems of DC gain mismatch and/or DC leakage in image coding and decoding. For example, these solutions can be incorporated into the JPEG XR image coding standard (ITU-T T.832|ISO/IEC 29199-2). In addition, various sections of the first and second example implementations use operators that are referenced and/or defined in the JPEG XR standard.

The implementations also refer to ways of addressing problems of DC leakage in a 4×4 operator for overlap processing in image coding and decoding, as described in U.S. patent application Ser. No. 12/165,474, filed Jun. 30, 2008.

1. Encoder/Decoder

A representative but generalized and simplified data encoder and decoder are illustrated and described as follows.

Figure 1:
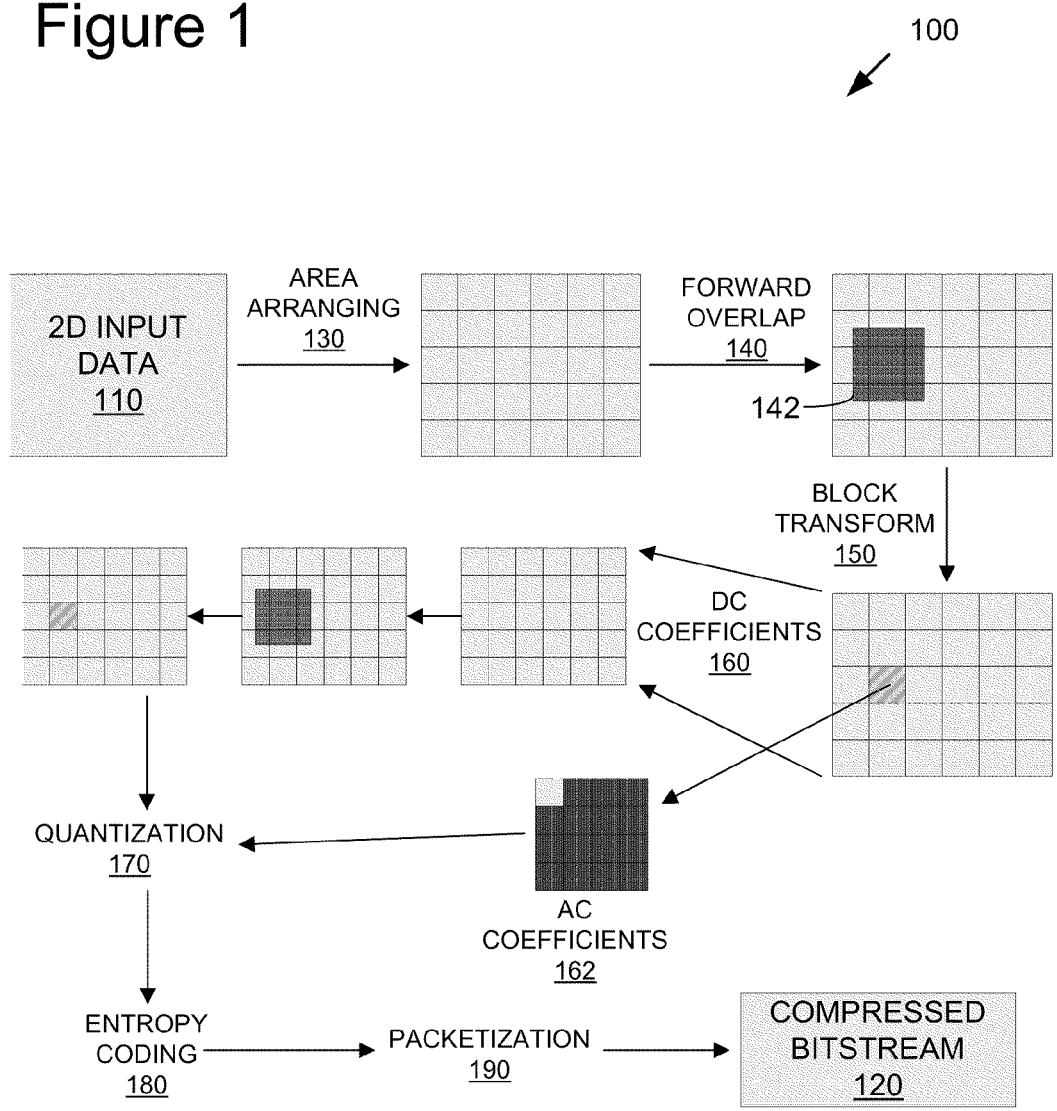
FIG. 1 is a flow diagram of an encoder that includes a lapped transform utilizing a reversible overlap operator.
Figure 2:
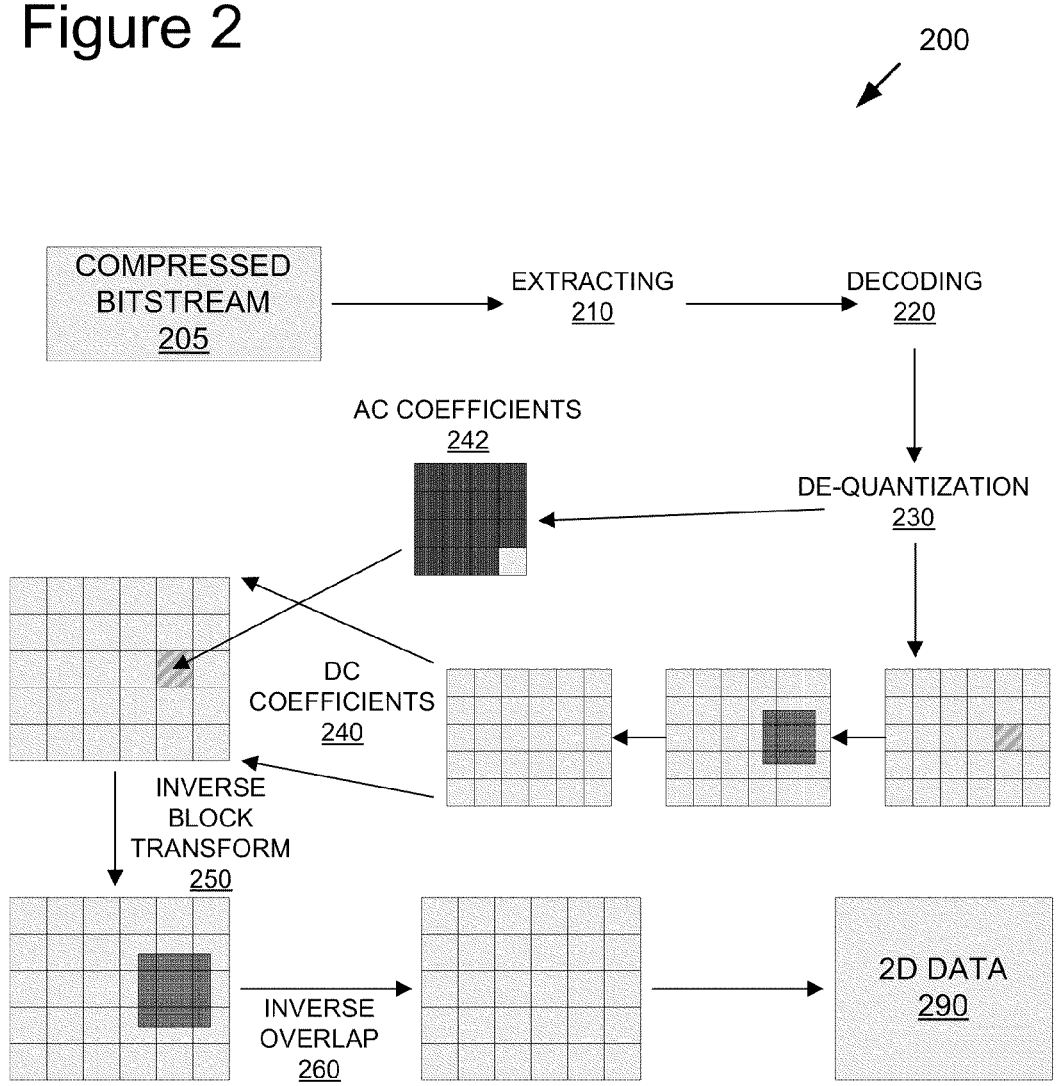
FIG. 2 is a flow diagram of a decoder that includes a corresponding inverse lapped transform.

FIGS. 1 and 2 are generalized diagrams of the processes employed in a representative 2D data encoder 100 and corresponding decoder 200. The encoder 100 and decoder 200 include processing for a lapped transform using techniques that address DC gain mismatch and/or DC leakage. The diagrams present a generalized or simplified illustration of the use and application of the technologies described herein in a compression system and decompression system incorporating the 2D data encoder and decoder. In alternative encoders and decoders based on these reduced DC gain mismatch and DC leakage techniques, additional or fewer processes than those illustrated in this representative encoder and decoder can be used for the 2D data compression. For example, some encoders/decoders may also include color conversion, any variety of color format processing, scalable coding, etc. The described compression and decompression system (encoder and decoder) can provide lossless and/or lossy compression of the 2D data, depending on the application of quantization which may be based on one or more quantization control parameters controlling the degree of fidelity loss in the encoded representation over a wide range of selectable fidelities, ranging from perfectly lossless all the way to very coarse (high compression ratio) representations.

The 2D data encoder 100 produces a compressed bitstream 120 that is a more compact representation (for typical input) of 2D data 110 presented as input to the encoder 100. For example, the 2D data input can be an image, a frame of a video sequence, or other data having two dimensions, referred to, generally, as an image. In an area arranging stage 130, the encoder 100 organizes the input data into blocks for later processing. For example, the blocks are 4×4 blocks of samples, 2×4 blocks of samples, or 2×2 blocks of samples. Alternatively, the blocks have other sizes.

In a first stage 140 of forward overlap processing, the encoder applies an overlap operator to the blocks of input data. The forward overlap operator (shown as shaded block 142) is, in an exemplary embodiment, four overlap transform operators. The encoder 100 then performs a block transform 150 on the respective blocks.

The encoder 100 separates the DC coefficients from the AC coefficients of the respective blocks for subsequent encoding. The encoder 100 performs an additional stage of overlap processing and forward frequency transforms on the DC coefficients. The additional stage of overlap processing can be skipped, and it can use the same overlap operators or different overlap operators as the first stage. For example, in some implementations the encoder 100 can choose whether the additional stage of overlap processing is performed or not, and signal the decision in the encoded data for a decoder to use in deciding which inverse overlap processing to perform. The encoder quantizes 170 the results of additional overlap transform of the DC coefficients, and the encoder quantizes the AC coefficients. The encoder then entropy codes 180 the coefficients, and packetizes the entropy coded information for signaling in the bit stream 120 along with side information indicating coding decisions that the decoder 200 will use in decoding.

With reference to FIG. 2, as a brief overview, the decoder 200 performs the reverse process. On the decoder side, the transform coefficient bits are extracted 210 from their respective packets in the compressed bitstream 205, from which the DC and AC coefficients are themselves decoded 220 and dequantized 230. The DC coefficients 240 are regenerated by applying an inverse transform, and the plane of DC coefficients is "inverse overlapped" in post-transform filtering that uses a suitable operator applied across the DC block edges. Subsequently, the blocks of samples are regenerated by applying inverse transform 250 to the DC coefficients and the AC coefficients 242 decoded from the bitstream. Finally, the block edges in the resulting image planes are inverse overlap filtered 260. The second stage of inverse overlap processing can use the same overlap operators or different overlap operators as the first stage of overlap processing. This produces a reconstructed 2D data output 290.

2. General Examples of Described Technologies

This section contains general examples of techniques that improve performance of overlap transform coding and corresponding decoding.

Figure 6A:
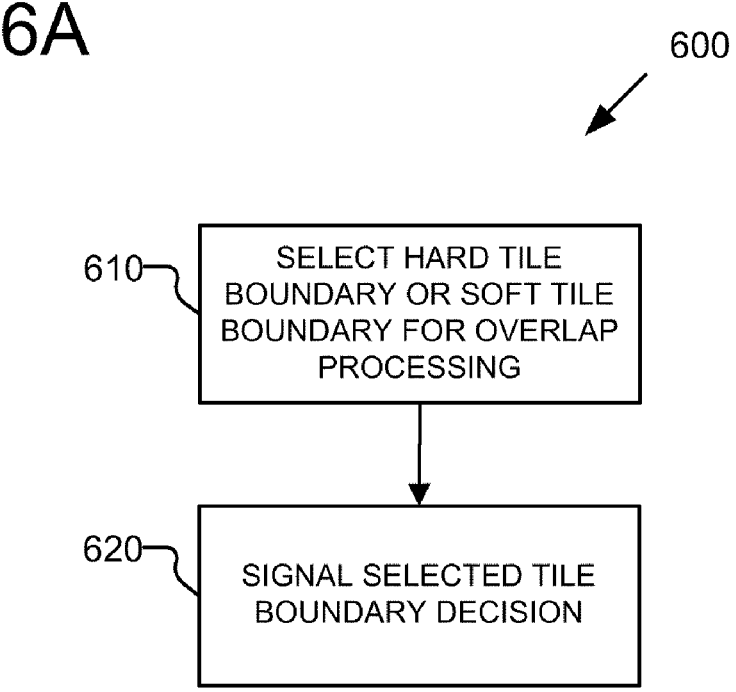
FIG. 6A is a flowchart depicting an example method for selecting and signaling a hard or soft tile boundary for overlap processing.

FIG. 6A depicts an example method 600 for selecting and signaling a hard or soft tile boundary for overlap processing. An encoder such as the one explained with reference to FIG. 1 performs the technique. Alternatively, another encoder performs the technique.

At 610, the encoder selects one of a hard tile boundary and a soft tile boundary to use when performing overlap processing during overlap transform coding. For example, the selection can be based upon a number of tiles present in an image to be encoded; the desired computational complexity of decoding, the desired quality of output, a user setting, whether separate decoding of individual tiles (without inter-tile dependencies) is a desired application feature, or another factor. In general, use of hard tile boundaries within an image results in fewer inter-tile dependencies, since the edges of tiles are treated as image boundaries for overlap processing. This facilitates decoding of individual tiles (as opposed to entire images) at the potential cost of compression efficiency (since more bits may be needed to mitigate blocking artifacts that could have been avoided with overlap processing, and since the overlap operation ordinarily also improves the transform compression property known as coding gain). On the other hand, use of soft tile boundaries permits overlap processing across tile boundaries, but creates dependencies between tiles for decoding. After making the tile boundary decision, the encoder performs overlap transform processing accordingly.

At 620, the encoder signals the selected tile boundary decision in an encoded bitstream. For example, the selected tile boundary decision can be signaled as a separate syntax element (e.g., as a single bit in an image header indicating whether a hard or a soft tile boundary is selected for overlap processing for a given image). The selected tile boundary can also be signaled in combination, or jointly, with other syntax elements, and can be signaled on a basis other than image-by-image.

Figure 6B:
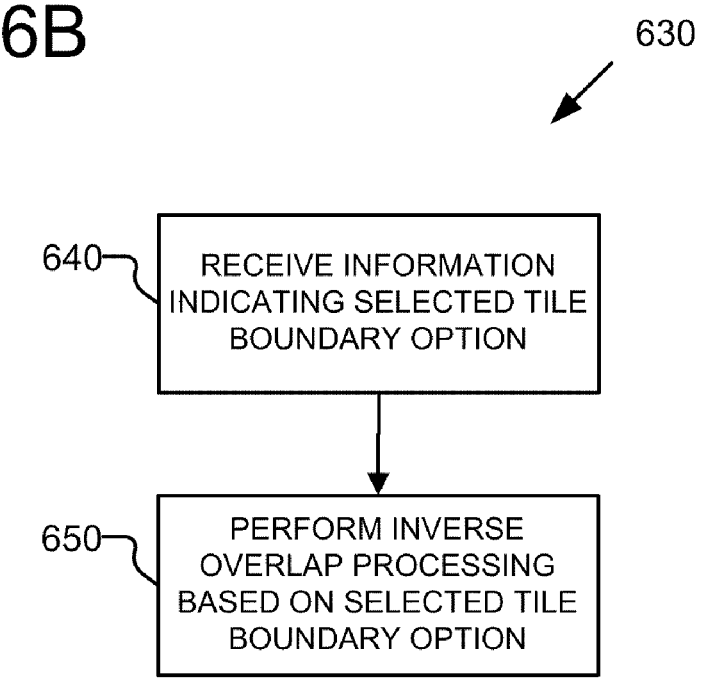
FIG. 6B is a flowchart depicting an example method for receiving a selected hard or soft tile boundary indicator for inverse overlap processing.

FIG. 6B depicts an example method 630 for receiving a selected hard or soft tile boundary indicator. A decoder such as the one explained with reference to FIG. 2 performs the technique. Alternatively, another decoder performs the technique.

At 640, the decoder receives information in an encoded bitstream indicating a selected tile boundary option for inverse overlap processing. The selected tile boundary option indicates one of a hard tile boundary and a soft tile boundary for inverse overlap processing. For example, the selected tile boundary option can be received as a separate syntax element or a jointly coded syntax element, and it can be received in an image header for an image or received at some other syntax level.

At 650, the decoder performs inverse transform decoding based at least in part on the selected tile boundary option. For example, the decoder performs selectively performs, or does not perform, inverse overlap processing across tile boundaries depending on whether soft tiles or hard tiles are used.

A tile boundary decision indicator can also be combined with a selected overlap mode, such that an overlap mode option indicates a combination of overlap stage and hard/soft tiling decisions. For example, one value of the overlap mode option can indicate that overlap is not applied (e.g., first and second overlap stages are not applied in a hierarchical overlap transform scheme with two stages), another value of the overlap mode option can indicate that only the first of two overlap stages is applied with soft tiling, another value of the overlap mode option can indicate two overlap stages are applied with soft tiling, another value of the overlap mode option can indicate that only the first of two overlap stages is applied with hard tiling, and yet another value of the overlap mode option can indicate two overlap stages are applied with hard tiling. Such an overlap mode option can be selected, used when performing overlap transform coding, and signaled in an encoded bitstream. The encoded bitstream is received by a corresponding decoder, and the selected overlap mode option is decoded and used when performing inverse overlap transform decoding.

Figure 7A:
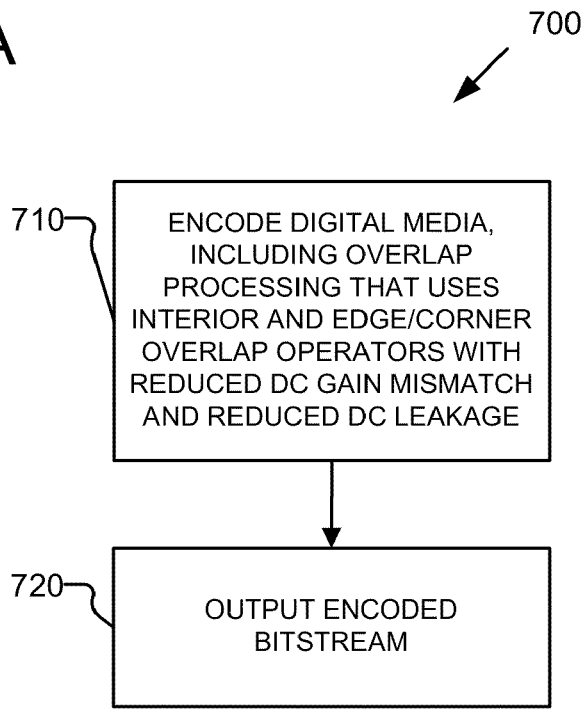
FIG. 7A is a flowchart depicting an example method for performing an overlap transform using overlap operators with reduced DC gain mismatch and reduced DC leakage.

FIG. 7A depicts an example method 700 for using overlap operators with reduced DC gain mismatch and reduced DC leakage in an overlap transform during encoding. An encoder such as the one explained with reference to FIG. 1 performs the technique. Alternatively, another encoder performs the technique.

At 710, the encoder encodes digital media, where the encoding includes overlap transform processing that uses plural overlap operators with reduced DC gain mismatch and reduced DC leakage. In particular, a first overlap operator (for interior regions) has a first DC gain, and a second overlap operator (for edge or corner regions) has a second DC gain that is substantially equivalent to the first DC gain. Examples of interior overlap operators, edge overlap operators and corner overlap operators having substantially equivalent DC gains are provided below for blocks of luma samples and chroma samples at different resolutions.

At 720, the encoder produces an encoded bitstream. For example, the bitstream follows the JPEG XR format or another format.

Figure 7B:
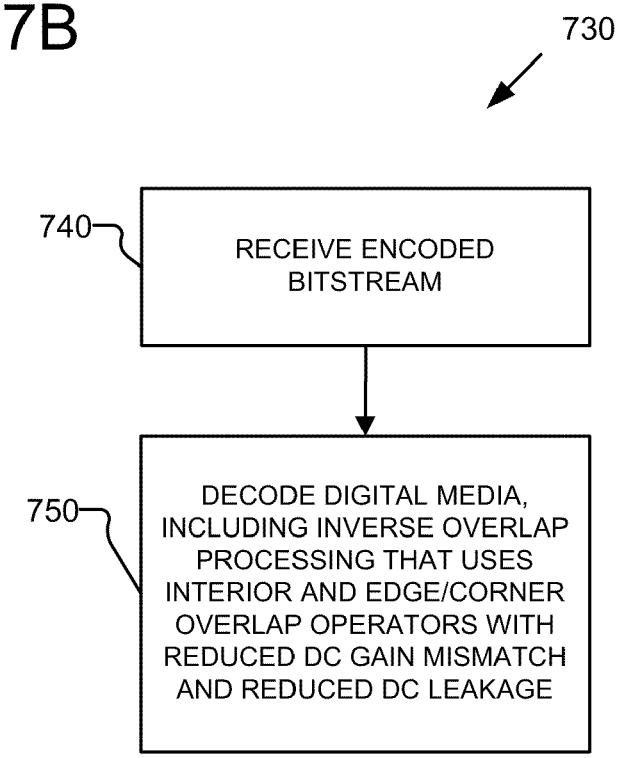
FIG. 7B is a flowchart depicting an example method for performing an inverse overlap transform using overlap operators with reduced DC gain mismatch and reduced DC leakage.

FIG. 7B depicts an example method 730 for using overlap operators with reduced DC gain mismatch and reduced DC leakage in an inverse overlap transform during decoding. A decoder such as the one explained with reference to FIG. 2 performs the technique. Alternatively, another decoder performs the technique.

At 740, the decoder receives an encoded bitstream. For example, the bitstream follows the JPEG XR format or another format.

At 750, the decoder performs inverse overlap transform processing that uses plural overlap operators with reduced DC gain mismatch and reduced DC leakage. In particular, a first overlap operator (for interior regions) has a first DC gain, and a second overlap operator (for edge or corner regions) has a second DC gain that is substantially equivalent to the first DC gain. Examples of interior overlap operators, edge overlap operators and corner overlap operators having substantially equivalent DC gains are provided below for blocks of luma samples and chroma samples at different resolutions.

The term "substantially equivalent DC gain" does not mean that the overlap operators must have exactly the same DC gain. Instead, the DC gain difference should be small enough to reduce (or even eliminate) undesirable artifacts resulting from the difference in DC gain between the overlap operators, considering operational constraints and planned applications. The target level of similarity in DC gain can vary depending on target implementation complexity versus desired quality, in addition to other factors. As examples, the sets of overlap operators presented below have substantially equivalent DC gain within the respective sets.

3. Example Implementations

Example implementations include lapped transform technology.

3.1 Theoretical Bases

As noted above, a lapped transform (also called an overlapped transform) is conceptually similar to a block transform. A conventional block transform has two steps:
1. partitioning of the input data into block regions (regions that consist of a string of samples in a 1D series or of a rectangular block-shaped array of samples in a 2D data set such as an image), and
2. applying transformation process to each block to analyze/decompose its frequency content.

For compression applications, the output of the block transform is quantized, and entropy coding is applied to the result. These steps are sometimes combined with other operations such as prediction processes and probability estimation processes. During decoding, a decoder applies inverse or approximate inverse operations for each of these processing stages.

A well known phenomenon associated with block transforms is the production of blocking artifacts, which are perceptual discontinuities that can occur in the reconstructed approximation that results from the decoding process. A well known way to mitigate blocking artifacts is to use lapped transforms. As explained above, in a lapped transform, the data blocks that form the input to the transformation process are overlapped with respect one another. One issue that arises in the use of lapped transforms is how to handle the edges of the signal. At the edge of a set of input data samples (such as the edge of an image), some of the data that would ordinarily be part of the lapped transform input for the encoder is not present. The system designer must determine how to handle these edge cases.

In image coding technology, a key concept is the decomposition of a large image into multiple tiles. A tile is a set of data that exactly or approximately corresponds to a particular (ordinarily rectangular) spatial image region of the picture. By segmenting the image into tiles and encoding each tile separately, it is possible to access part of an image and decode it without decoding the complete image. The ability to access particular regions of the image can be especially useful when the images are large. However, segmenting a large image into smaller tile regions can create more edges in the picture—namely, the edges that separate tiles from other tiles within the image. At each of these edges, tile boundary phenomena can occur that are directly analogous to blocking artifacts.

In prior versions of the JPEG XR standard, overlap operations, when enabled, are applied across image tile boundaries as well as across individual block boundaries of the block transform. While this approach has advantages under some circumstances, a consequence of this design choice is that tile-based image encoding and retrieval has more computational complexity when accessing tile-aligned image regions than it would if the overlap operations were not applied across the image tile boundaries. This added computational cost is due to the data dependencies across neighboring tiles that are induced by the overlap processing of the transform regions, which has the consequence that in order to decode a particular tile region, it is necessary to also access and at least partially decode data stored for the spatially-neighboring tiles.

In contrast, in example implementations presented herein, tile boundaries are classified as one of two types, as follows:
   "Hard" tile boundaries, such that the edge of a tile is treated the same way as the edge of an image, so there is no overlapping of the transform blocks that are applied across the tile boundary, or
   "Soft" tile boundaries, where overlapping of the transform blocks applies across the tile boundary.

In some prior designs such as JPEG 1 and JPEG 2000, all tile boundaries are processed as hard tile boundaries. In contrast, in prior versions of the JPEG XR standard, tile boundaries are processed as soft tile boundaries. Each type of boundary processing is actually useful under some circumstances. In example implementations presented herein, an encoder can choose to use either hard or soft tile boundaries at its discretion, and to signal that choice along with the compressed representation of image data. Moreover, in example implementations presented herein, even when hard tile boundaries are used, at least some edge samples within a given tile next to a tile boundary are nevertheless overlap processed with edge operators, so as to reduce DC gain mismatch that could cause problems due to application of interior overlap operators within the tile.

Example implementations also use lifting-based transformation operations. The phenomenon known as "DC leakage" can sometimes be a problem in such transformations. If a transform exhibits DC leakage, it is possible for the output of the forward transform to contain significant non-DC transform coefficients for some constant-valued input signals (for which the DC coefficients, in theory, should be the only non-zero frequency coefficients). DC leakage can sometimes cause a loss of compression performance and perceptible artifacts (such as waves or distortion in smooth areas) in the decoded output.

In a large image, having some loss of compression performance and perceptual artifacts that occur only near the outer boundaries of the image may be acceptable in a compression coding design. However, since tile segmentation using hard tile boundaries creates more areas that give rise to such phenomena, it becomes more important to carefully design the handling of the edge regions when the design may include hard tile boundary support.

Issues that arise with tile support in an image coder can also arise with higher level support of large "meta images" at a systems level, where a meta image is constructed as a larger data set from multiple smaller images that are each encoded separately. Again, in such a usage scenario, it becomes more important to handle the image edges carefully.

Thus, it is desirable to have hard-tile-boundary coding options so that each image tile can be handled independently. One solution is to treat tile boundaries the same as overall image boundaries. However, in some cases, the transform design has an undesirably high DC leakage phenomenon in the operations used near the edges of the image. Additionally, and even more significantly, there is a DC gain difference between the output of the edge handling operations and the processing performed for the interior regions of the image.

Recognizing a few points helps address DC gain mismatch and DC leakage in overlap, transforms near the image boundaries. First, in prior implementations, overlap operators suffer DC gain mismatch between interior operators and corner and edge operators, therefore causing decreased compression efficiency and significant visual artifacts. Second, edge, corner, and chroma interior operators in prior implementations also suffer from DC leakage, which also causes decreased compression efficiency and significant visual artifacts. Additionally, DC leakage characteristics for the handling of the interior areas of the image in 4:2:0 and 4:2:2 chroma cases are also problematic in prior implementations.

3.2 Overview of Example Implementations

Example implementations use a hierarchical lapped transform. The transform has four stages:
   1. First stage overlap processing;
   2. First stage core transform;
   3. Second stage overlap processing;
   4. Second stage core transform.

The overlap stages operate on a skewed grid with respect to the core transform operators. That is, the core transforms operate on 4×4 blocks arranged in a grid aligned with the upper left pixel in the image. The overlap stages operate on a similarly sized grid but with a 2 pixel horizontal and 2 pixel vertical offset from the top left corner pixel. The corresponding inverse overlap transform also has four stages: a first stage inverse core transform, first stage inverse overlap processing, second stage inverse core transform, and second stage inverse overlap processing.

Unfortunately, as previously implemented, the overlap operators possess flaws in terms of DC gain mismatch and DC leakage. In particular, the edge overlap operators (those operating in the 2 pixels width edges induced by the grid offset of the overlap stages) are problematic. Because hard tiling involves significant use of these edge operators in central regions of the image (as the most natural solution to allow hard tiling), artifacts induced by problems with these operators become far more apparent. Even without hard tiling, the previous overlap operators produce an unacceptable amount of visible artifacts in images.

In example implementations presented herein, the overlap transforms are implemented through 6 different operators. These are grouped into two groups of three operators, the full resolution group and the chroma group. The three full resolution overlap operators are:

1. Overlap4×4 operator—interior overlap processing operation;
2. Overlap4×1 operator—edge overlap processing operation;
3. CornerOverlap2×2 operator—corner overlap processing operation.

Figure 3:
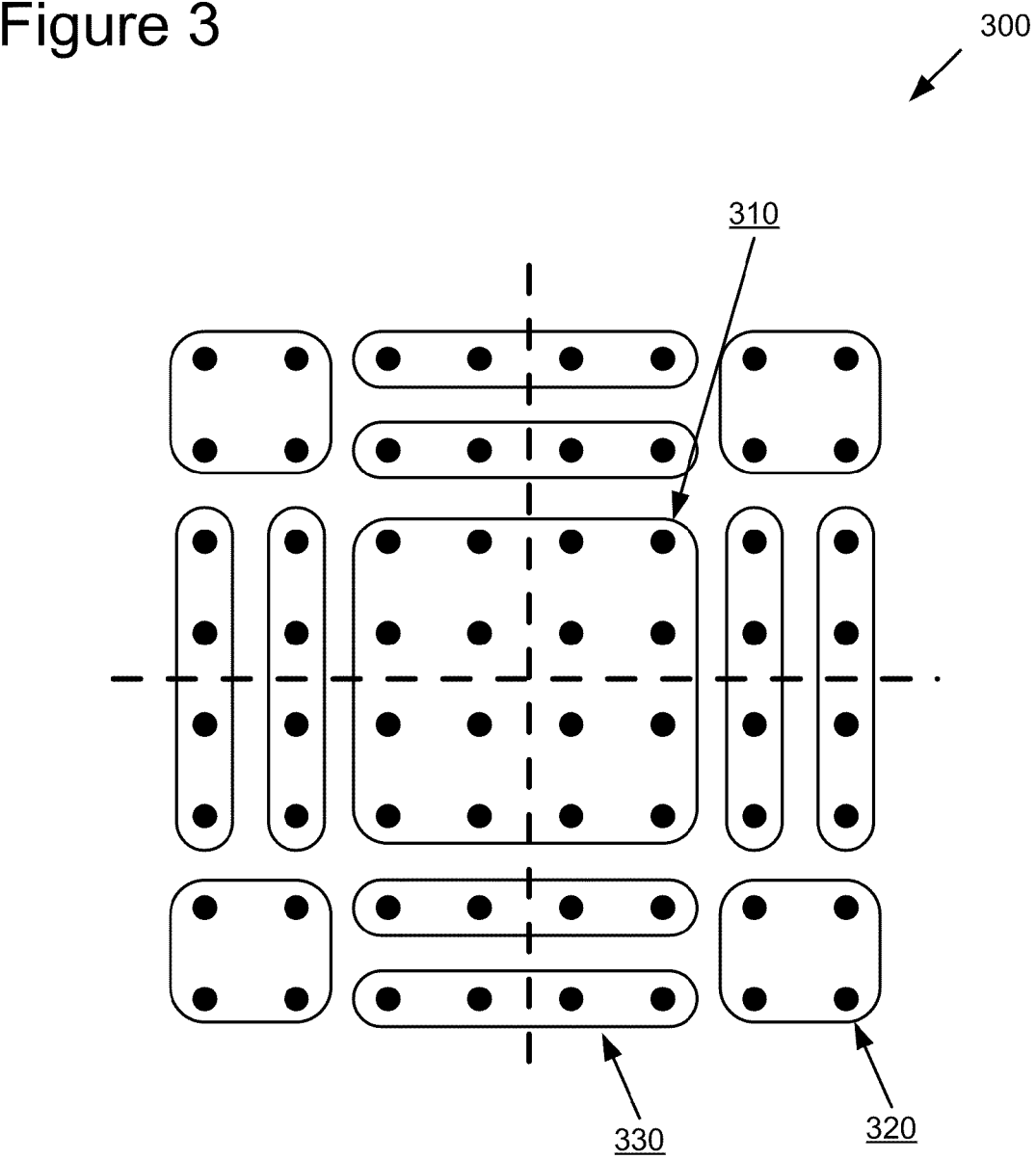
FIG. 3 is a diagram of an arrangement of blocks in example implementations, depicting layout of 4×4 interior, 4×1 edge, and 2×2 corner overlap operators for use in a first stage overlap transform and for full resolution channels in a second stage of overlap transform in the example implementations. The depicted overlap operators are also used in corresponding stages of an inverse overlap transform in the example implementations.

FIG. 3 depicts a diagram 300 of the layout of these operators. FIG. 3 depicts a 2 block×2 block region of samples. The dots represent samples, and the central horizontal and vertical dashed lines indicate the block boundaries for transform coding and decoding. The rounded corner boxes represent the region of support for each of the overlap operators. The rounded box 310 around the central 4×4 region of samples represents the interior Overlap4×4 operator, the rounded boxes (e.g., 320) around the 4 corner 2×2 regions of samples represent the CornerOverlap2×2 operator, and the rounded boxes (e.g., 330) around the other 8 4×1 (or 1×4) regions of samples represent the Overlap4×1 operator. These three full resolution operators are used for all channels in the first stage overlap transform and for full resolution channels (i.e., luma and chroma in 4:4:4 sampling mode) in the second stage overlap transform.

The three chroma operators are:

1. Overlap2×2 operator—interior overlap processing operation;
2. Overlap2×1 operator—edge overlap processing operation;
3. CornerOverlap1×1 operator—corner overlap processing operation.

These chroma operators are used for the second stage overlap transform for downsampled (4:2:2 or 4:2:0 resampling) chroma channels.

Figure 4:
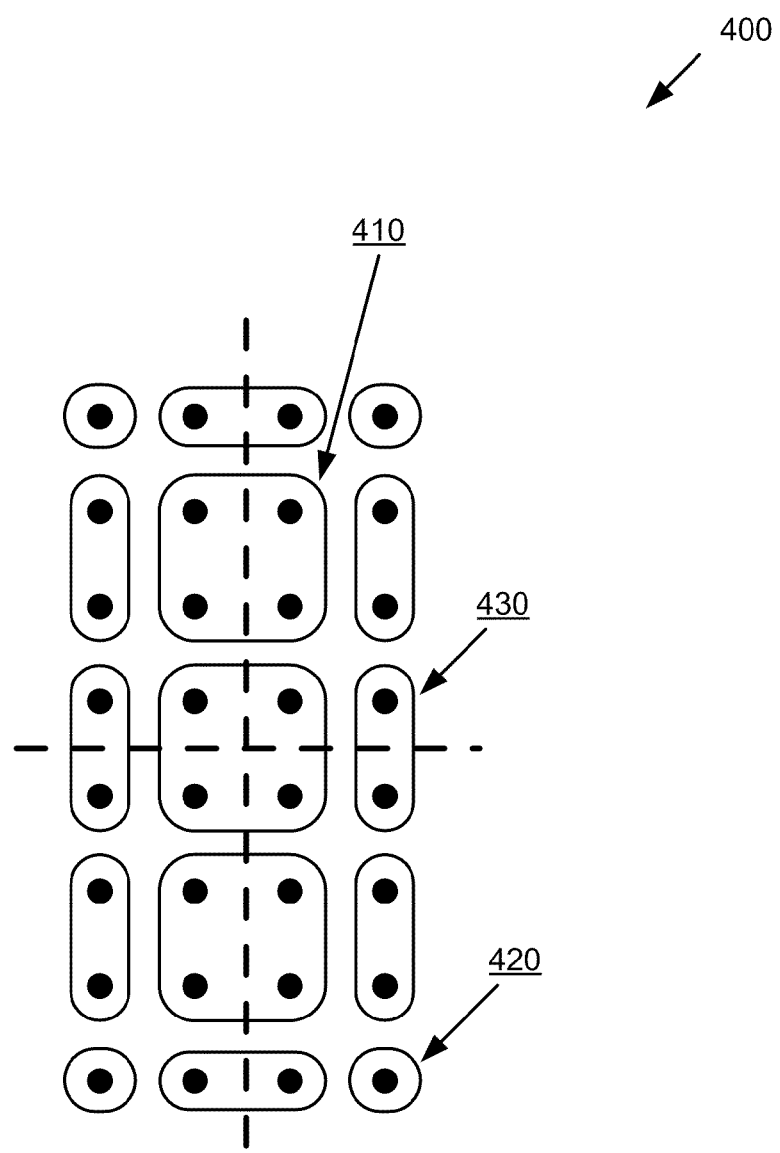
FIG. 4 is a diagram of an arrangement of blocks in example implementations, depicting layout of 2×2 interior, 2×1 edge, and 1×1 corner overlap operators for use in a second stage overlap transform for 4:2:2 downsampled chroma channels in the example implementations. The depicted overlap operators are also used in corresponding stages of an inverse overlap transform in the example implementations.

FIG. 4 shows a diagram 400 of a layout of these chroma operators as applied to chroma channels with 4:2:2 resampling. FIG. 4 depicts overlap operators for use in the second stage overlap transform for 4:2:2 downsampled chroma channels. For a 2×2 arrangement of blocks, the layout of the overlap chroma operators is applied to 4:2:2 samples. The dots represent samples, and the central horizontal and vertical dashed lines indicate the block boundaries for transform coding and decoding. The rounded corner boxes (and circles) thus represent the domain/support of various overlap operators. The rounded box 410 around the central 2×2 regions of samples represents the interior Overlap2×2 operator, the rounded boxes (e.g., 420) around the 4 corner 1×1 regions of samples represent the CornerOverlap1×1 operator, and the rounded boxes (e.g., 430) around the other 8 2×1 (or 1×2) regions of samples represent the Overlap2×1 operator.

Figure 5:
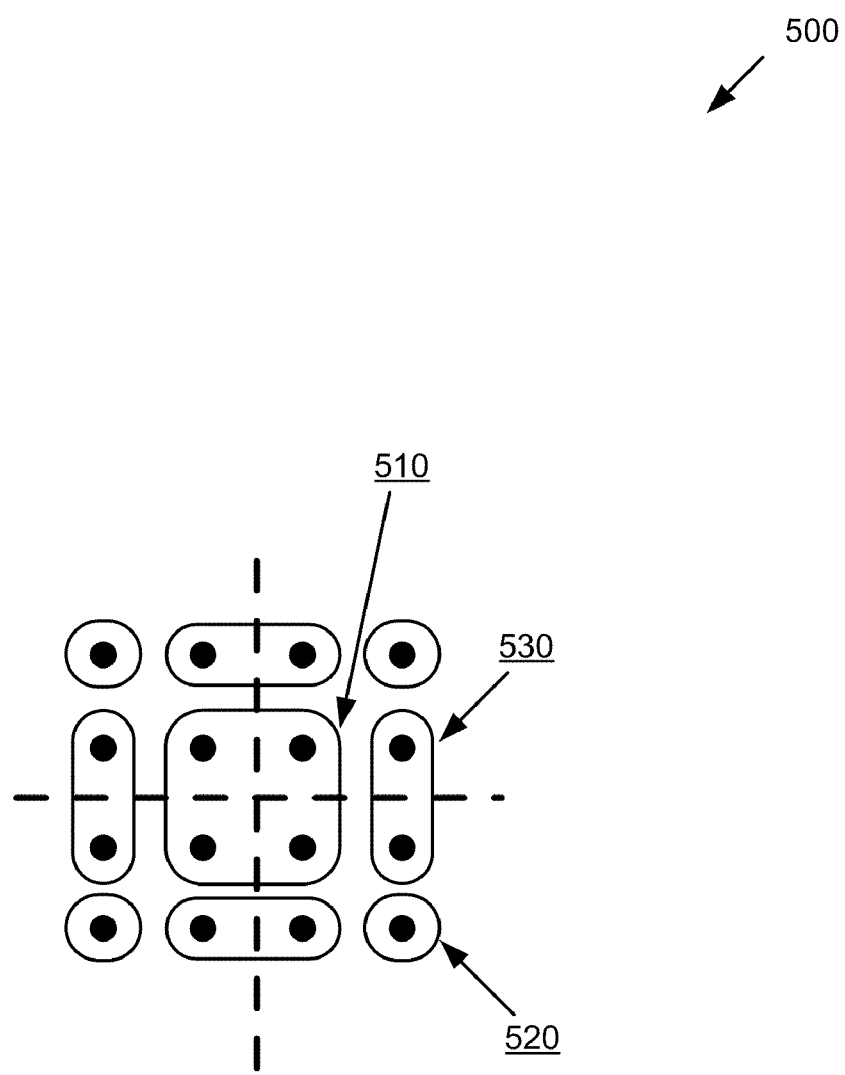
FIG. 5 is a diagram of an arrangement of blocks in example implementations, depicting layout of 2×2 interior, 2×1 edge, and 1×1 corner overlap operators for use in a second stage overlap transform for 4:2:0 downsampled chroma channels in the example implementations. The depicted overlap operators are also used in corresponding stages of an inverse overlap transform in the example implementations.

FIG. 5 shows a diagram 500 of layout of these chroma operators applied to chroma channels with 4:2:0 resampling. FIG. 5 depicts overlap operators for use in the second stage overlap transform for 4:2:0 downsampled chroma channels. For a 2×2 arrangement of blocks, the layout of the overlap chroma operators is applied to 4:2:0 samples. The dots represent samples, and the dashed lines indicate the block boundaries for transform coding and decoding. The rounded corner boxes (and circles) thus represent the domain/support of various overlap operators. The rounded box 510 around the central 2×2 region of samples 510 represents the interior Overlap2×2 operator, the rounded boxes (e.g., 520) around the 4 corner 1×1 regions of samples represent the CornerOverlap1×1 operator, and the rounded boxes (e.g., 530) around the other 4 2×1 (or 1×2) regions of samples represent the Overlap2×1 operator.

Two issues arise in the design of these operators: DC gain mismatch and DC leakage. Ideally, within each of the two operator sets (full resolution and chroma), the DC gain factor for all three operators should be equivalent. The issue of DC gain mismatch arises when the three DC gains do not match.

DC leakage is the phenomenon by which a perfectly flat input to the transform results in both DC and AC coefficients. The DC Leakage is measured by the magnitude of the AC coefficients that result.

As a result of these two problems, a perfectly flat image coded using only its DC coefficients (ignoring all high frequency coefficients) will not have a perfectly flat reconstruction. The differences in reconstructed pixel values can be viewed as the sum of two terms: a) scaling DC gain mismatch, and b) DC leakage.

Difference~ScalingGainMismatch+DCLeakage.

One solution to the DC leakage problem in the Overlap4×4 operator is presented in U.S. patent application Ser. No. 12/165,474.

In the example implementations presented herein, a number of solutions that reduce or even eliminate DC gain mismatch and DC leakage are presented for the remaining five operators (the five operators other than the Overlap4×4 full resolution operator). With the remaining five operators, the magnitude of DC gain mismatch is typically much larger than the magnitude of DC leakage, although perceptual artifacts cause by DC leakage may be more objectionable in general. Thus, the main problem that needs to be solved is the DC gain mismatch between the overlap operators. The secondary problem is the DC leakage in the overlap operators.

The next section describes the syntax and semantics for several solutions that enable soft/hard tile boundary decisions. Later sections describe new overlap operators designed to eliminate artifacts induced by prior overlap operators. In addition to hard tiling scenarios, these new overlap operators are also useful in "stitching" scenarios in which a single large image is broken into small chunks which are compressed independently. At a later time, the images are "stitched" together by displaying them adjacently according to their original relationships.

3.3 Overview of Syntax for Hard/Soft Tiling Decisions

Example implementations support both hard and soft tile boundaries. Soft tile boundaries are more efficient for processing large numbers of tiles in a tiled image and mitigate blocking artifacts. Hard tile boundaries allow more efficient processing for a limited number of tiles in an image. Two categories of options are described with respect to the syntax and semantics for hard/soft tile boundary decisions.

Breaking Change Syntax. A first category of options changes the syntax of prior implementations. A first option is the addition of a new syntax element signaling whether hard or soft tiling used. For example, the new syntax element is a flag in an image header.

A second option is to add values for a overlap level syntax flag (OVERLAP_MODE) that already indicates overlap mode information. In prior implementations, OVERLAP- _MODE is a 2-bit syntax element having the following three possible values and corresponding interpretations.
1. OVERLAP_MODE=0 means neither stage of overlap processing is applied.
2. OVERLAP_MODE=1 means only the first of the two overlap processing stages is applied.
3. OVERLAP_MODE=2 means both stages of overlap processing are applied.

The second option alters the OVERLAP_MODE syntax element to be a 3-bit syntax element. The above overlap modes are altered to correspond to soft tiling mode (at least for OVERLAP_MODE=1 or OVERLAP_MODE=2, since OVERLAP_MODE=0 is by default hard tile boundaries; with no overlap processing), and the following additional values and interpretations are added.
4. OVERLAP_MODE=3 means only the first of the overlap processing stages is applied, and overlap processing is performed in the hard tiling format.
5. OVERLAP_MODE=4 means both stages of overlap processing are applied, and overlap processing is performed in the hard tiling format.

Decoders that do not support the 3-bit OVERLAP_MODE syntax element could not successfully decode images using this syntax element. Thus, the addition of new bits would result in legacy decoders failing to decode images.

Backwards Compatible Syntax. To allow legacy decoders to process new bitstreams (even if decoding results in significant artifacts), the use of the sub-version number syntax element (labeled RESERVED_C in the JPEG XR specification) can be used. For example, bitstreams containing changes presented in U.S. patent application Ser. No. 12/165,474 have a sub-version value of 1 and otherwise the sub-version value is 0. The second least significant bit of the sub-version number can be used to signal hard or soft tiling. In this scheme, use of soft tiles is signaled by setting the second least significant bit to zero, and use of hard tiles is signaled by setting the second least significant bit to one. Legacy decoders that ignore the sub-version value would decode both hard and soft tiled images successfully, though significant artifacts may result for hard tile images since soft tile boundary overlap processing is used by default. More developed decoders would be able to respond to the value of the sub-version number and decode the image correctly without artifacts when hard tiling is used.

The hard tiling setting would be coded as follows:

HardTilingTrueFlag=(RESERVED_C>>1)&1.

3.4 Overview of Prior Overlap Operators

At the decoder, the prior Overlap4×4 operator is designed to have a scaling of $1/(s^2)$, where s=0.8272. In other words, the Overlap4×4 operator scales up the DC value by approximately 1.4614. (This is the Overlap4×4 operator as described in U.S. patent application Ser. No. 12/165,474.) The prior Overlap4×1 operator is designed to have a scaling of 1/s of the DC value. In other words, the Overlap4×1 operator scales up the DC value by approximately 1.2089. The prior corner operator CornerOverlap2×2 is null (no operations are performed), so the corresponding DC value has an implicit scaling of 1.0. Several observations should be made regarding these prior operators. First, scaling with the prior operators typically ensures that the basis of the inverse overlap is smooth and provides greater coding gain in addition to less significant artifacts. Second, the actual scaling performed by the operator is slightly different due to the integerized implementation. Third, the corresponding encoder overlap operators perform inverse scaling to that of the decoder. Fourth, such scaling down at the encoder has some implications for lossless coding. For lossless coding, even a perfectly flat image needs to produce AC coefficients (and thus necessarily loses some compression efficiency). Fifth, the rounding used in the integerized implementation has a small effect on some of the analysis and experimental results. In particular, many quantities such as ScalingGainMismatch and DCLeakageRatio are only approximately linear.

In the following description of overlap operators, DC leakage and DC gain mismatch are calculated for the operators. The method used below for calculating DC leakage gives approximately the same result as theoretical analysis based on matrix coefficients, and the method is simpler and faster. Finally, to illustrate the extent of DC leakage and DC gain mismatch, the DC scaling gain ratio and DC leakage are derived for each overlap operator by considering an input block where all pixels values are equal to 1000000 (10^6). This input is called value $X_1$.

Prior Overlap4×4 operator for full resolution. For an example prior Overlap4×4 operator, if given input $X_1$, the output pixels have the value 1461540 or 1461547. Thus, the ScalingGainRatio of the Overlap4×4 operator is about 1.461543. The difference in the output values (i.e., 11461540−14615471=7) is due to DC leakage. The DCLeakageRatio of the prior Overlap 4×4 operator is 7/10^6.

For 8-bit sample images, the largest range is +/−128/(ScalingGainRatio). Thus, maximum DC leakage of the 4×4 operator on 8-bit images is (7/10^6)*128/ScalingGainRatio=0.000896/ScalingGainRatio=0.000614. The maximum DC leakage on 16-bit images is 256*0.000614~0.157.

Prior Overlap4×1 operator for full resolution. For an example prior Overlap4×1 operator, if given input $X_1$, the output pixels have the value 1206726 or 1205078. The ScalingGainRatio of Overlap4×1 is about 1.2058. If the input to the inverse Overlap4×1 operator are all the same value, the matrix representation of the scaling stage of this operator on a pair of input values can be represented as:

$$\begin{bmatrix} 1 & x \\ 0 & 1 \end{bmatrix} \begin{bmatrix} 1 & 0 \\ y & 1 \end{bmatrix} \begin{bmatrix} 1 & x \\ 0 & 1 \end{bmatrix} = \begin{bmatrix} 1+xy & x(2+xy) \\ y & 1+xy \end{bmatrix},$$

where x=3/32 and y=3/16. The scaling on one of the inputs is 1+xy+x(2+xy)=19771/16384~1.206726, and the scaling on the other input is $$y + 1 + xy = \frac{617}{512} \sim 1.205078.$$

The DCLeakageRatio is 19771/16384−617/512=27/16384=0.001648. The difference in the output values (1206726−1205078=1648) is due to DC leakage. The DCLeakageRatio is (1648/10^6). This DC leakage is small, but still significant.

For 8-bit sample images, maximum DC leakage is 127/ScalingGainRatio*(1648/10^6)~0.1788/ScalingGainRatio~0.12247. For 16-bit sample images, the maximum DC leakage can be +/−46/ScalingGainRatio~31.35.

Prior CornerOverlap2×2 operator for full resolution. In prior implementations, there is no overlap operator for the corners. The ScalingGainRatio is 1.0, and the DCLeakageRatio is 0.0.

Effect of DC Gain Mismatch for prior full resolution operators. In the prior implementation, in terms of magnitude (if not perceptual significance) the main problem is DC gain mismatch, and the worst case effect can be quantified theoretically as follows. For 8-bit sample images, at the edge, the worst case ScalingGainMismatch would be (1.4615−1.205)*128/ScalingGainRatio~22.48. For 8-bit sample images, at the corners, the worst case ScalingGainMismatch is about (1.4615−1.0)*128/ScalingGainRatio~59/ScalingGainRatio~40.46. For 16-bit sample images, the worst case ScalingGainMismatch at the edges and corners would be 22.4*256 and 40.46*256=10,393.6 respectively. The total worst case difference can be approximated as the sum of ScalingGainMismatch and DCLeakage.

Prior Overlap2×2 Chroma Operator. For an example prior Overlap2×2 operator, if the input to the inverse Overlap2×2 operator is all the same value, the matrix representation of the scaling stage of this operator on a pair of input values can be represented:

$$\begin{bmatrix} 1 & 0 \\ x & 1 \end{bmatrix}\begin{bmatrix} 1 & y \\ 0 & 1 \end{bmatrix}\begin{bmatrix} 1 & 0 \\ x & 1 \end{bmatrix} = \begin{bmatrix} 1+xy & y \\ x(2+xy) & 1+xy \end{bmatrix},$$

$$\begin{bmatrix} 1 & x \\ 0 & 1 \end{bmatrix}\begin{bmatrix} 1 & 0 \\ y & 1 \end{bmatrix}\begin{bmatrix} 1 & x \\ 0 & 1 \end{bmatrix} = \begin{bmatrix} 1+xy & x(2+xy) \\ y & 1+xy \end{bmatrix},$$

where x=¼ and y=½. The scaling on one of the inputs is 1+xy+x(2+xy)=53/32=1.656235, and the scaling on the other input is $$y + 1 + xy = \frac{13}{8} = 1.625$$

The DCleakageRatio is 53/32−13/8=1/32=0.03125.

Prior Overlap2×1 Chroma Operator. For an example prior Overlap2×1 operator, if the input to inverse Overlap2×1 operator are all the same value, the matrix representation of the scaling stage of this operator on a pair of input values can be represented:

$$\begin{bmatrix} 1 & 0 \\ x & 1 \end{bmatrix}\begin{bmatrix} 1 & y \\ 0 & 1 \end{bmatrix}\begin{bmatrix} 1 & 0 \\ x & 1 \end{bmatrix} = \begin{bmatrix} 1+xy & y \\ x(2+xy) & 1+xy \end{bmatrix},$$

$$\begin{bmatrix} 1 & x \\ 0 & 1 \end{bmatrix}\begin{bmatrix} 1 & 0 \\ y & 1 \end{bmatrix}\begin{bmatrix} 1 & x \\ 0 & 1 \end{bmatrix} = \begin{bmatrix} 1+xy & x(2+xy) \\ y & 1+xy \end{bmatrix},$$

where x=⅛ and y=¼. The scaling on one of the inputs is 1+xy+x(2+xy)=329/256=1.28515625, and the scaling on the other input is y+1+xy=41/32. The DCLeakageRatio is 329/256−41/32=1/256=0.003906.

Prior CornerOverlap1×1 Chroma Operator. In prior implementations, there is no 1×1 overlap operator for the corners. The ScalingGainRatio is 1.0, and the DCLeakageRatio is 0.0.

3.5 Solutions for Overlap4×1 Operator

Three solutions are presented for the Overlap4×1 operator, where one of the three solutions has multiple variants. Application of the prior Overlap4×1 operator over its pixels is denoted as Overlap4×1(a,b,c,d).

Solution 1 for Overlap4×1 Operator. Since the DC gain of the prior Overlap4×1 operator is roughly the square root of the DC gain of Overlap4×4, the first solution is to apply the prior Overlap4×1 operator twice. Overlap4×1 Solution1(a,b,c,d) is specified as:
1. Overlap4×1(a,b,c,d);
2. Overlap4×1(d,c,b,a).
By reversing the order between the two applications of the operator, the DC leakage introduced by the first stage is cancelled by the second stage. Repeating the ordering would induce the leakage to accumulate. Unfortunately, this solution still suffers from significant DC gain mismatch.

If this Overlap4×1Solution1 operator takes input $X_1$, the output samples have the value 1454061 or 1453548 or 1454852 or 1454340. The ScalingGainRatio is approximately 1.4542. The DCLeakageRatio is (1454852−1453548)/10^6=1304/10^6. For 8-bit sample images, worst case ScalingGainMismatch for 8-bit images is (1.4615−1.4542)*128/ScalingGainRatio=0.9344/ScalingGainRatio~0.64. Worst case DCLeakage can be 127/ScalingGainRatio*1304/10^6~0.16561/ScalingGainRatio. For 16-bit sample images, worst case ScalingGainMismatch is 0.9344*256/ScalingGainRatio~239.2064/ScalingGainRatio~163. The worst case DC leakage can be 256*0.16561/ScalingGainRatio~42.39/ScalingGainRatio~28.76. In terms of complexity, this solution has roughly twice the complexity of the prior Overlap4×1 operator.

Solution 2 for Overlap4×1 Operator. Solution 2 is similar in spirit to solution 1—it involves the application of a single operator to the same samples twice. For this solution though, the scaling of the prior Overlap4×1 operator is altered by adding additional lifting steps. As before, Overlap4×1Solution2(a,b,c,d) is specified as:
1. Overlap4×1Altered(a,b,c,d);
2. Overlap4×1Altered(d,c,b,a).
These modifications use 6 extra lifting steps in the scaling stage, where each lifting step has one addition and one shift.

The idea behind this solution 2 is to change x and y so that both DC leakage and DC scaling gain mismatch are minimized. (As used herein, "minimize" means reduce to acceptable operating levels.) The condition for minimizing DC leakage is as follows $$1+xy+x(2+xy)=y+1+xy$$

Solving for y yields $$y = \left(\frac{2x}{1-x^2}\right).$$

In this case, the ScalingGainRatio of one stage of the Overlap4×1Altered operator can be computed:

$$y + 1 + xy = y(1+x) + 1 = \frac{2x}{1-x} + 1 = \frac{1+x}{1-x}.$$

Let the square root of the DC gain of the Overlap4×4 operator be denoted as k. Therefore, the value of x that minimizes ScalingGainMismatch is given by:

$$\frac{1+x}{1-x} = k.$$

Or:

$$\frac{k-1}{k+1} = x.$$

Once, the value of x that minimizes ScalingGainMismatch using this equation has been determined, the value of y (that minimizes DC leakage) can be determined using the earlier equation $$y = \left(\frac{2x}{1-x^2}\right).$$

In this case, the ScalingGainRatio of the Overlap4×4 operator≅1.461543. Therefore, the value of k≅sqrt(1.461543)≅1.208943, and the DC scaling gain must approximate this value to minimize DC scaling gain mismatch. Therefore, the value of x must approximate 0.094589554, and the value of y should be chosen according to the earlier equation.

In practice, x can be approximated by a value that can be implemented using dyadic lifting steps; the value of y can be selected, and then y can be approximated by a value that can be implemented using dyadic lifting steps. Empirical results show that the objective of minimizing DC leakage is more important than the objective of minimizing DC scaling gain mismatch. Therefore, the approximation of y for a given value of x should be much more accurate than the initial approximation of x.

Solution 2a for Overlap4×1 Operator. Choose x=3/32 and y=775/4096=3/16+1/512−1/4096. This solution has minimal DC leakage. The DC gain of this solution is:

$$\frac{1+x}{1-x} = 1.206897.$$

Therefore, this solution still has a small amount of ScalingGainMismatch. There are no additional lifting steps for implementing x as compared to the prior Overlap4×1 operator. The implementation of y uses two additional lifting steps as compared to the prior Overlap4×1 operator.

Solution 2b for Overlap4×1 Operator. Choose x=97/1024=3/32+1/1024 and y=49/256=3/16+1/256. This solution has minimal DC leakage. The DC gain of this solution is:

$$\frac{1+x}{1-x} = 1.209277.$$

Therefore, this solution still has a small amount of ScalingGainMismatch, but smaller than Solution 2a for the Overlap4×1 operator. Note that there is one additional lifting step for implementing x as compared to the prior Overlap4×1 operator. The implementation of y uses one additional lifting step as compared to the prior Overlap4×1 operator. Since the scaling stage calls for x to applied twice, and y to be applied once, there are 3 extra lifting steps in the new solution 2b for the Overlap4×1 operator.

Solution 2c for Overlap4×1 Operator. Choose x=775/8192, 3/32+1/1024−1/8192, and y=391/2048=3/32+1/512−1/2048. The DC gain of this solution is:

$$\frac{1+x}{1-x} = 1.208979.$$

Therefore, this solution has a minimal amount of ScalingGainMismatch. There are two extra lifting steps in implementing x. There are two extra lifting steps in implementing y. Since the scaling stage calls for x to applied twice, and y to be applied once, there are 6 extra lifting steps in the new solution.

The modifications to Overlap4×1 have the advantage of further reducing both DC gain mismatch and DC leakage. By retaining the spirit of Solution 1, all of its benefits are likewise retained. If this operator takes input $X_1$, the output pixels all have the value 1461631. The ScalingGainRatio is approximately 1.4616. The DCLeakageRatio is approximately 0 (much smaller than $2^{-16}$).

For 8-bit sample images, worst case ScalingGainMismatch is (1.461543−1.461631)*128/ScalingGainRatio=0.000088/ScalingGainRatio. Worst case DCLeakage is 0. For 16-bit sample images, worst case ScalingGainMismatch is 0.000088*256/ScalingGainRatio=0.022528/ScalingGainRatio. Worst case DC Leakage is 0.

In terms of complexity of solution 2c for the Overlap4×1 operator, the six additional lifting steps in Overlap4×1 Altered make its complexity 1.5 times larger than Overlap4×1. Thus, the overall solution Overlap4×1Solution2 has roughly 3 times the complexity of the prior Overlap4×1 operator.

Solution 3 for Overlap4×1 Operator. For this solution, the scaling stage of the prior Overlap4×1 operator is replaced by the scaling stage of the prior Overlap4×4 operator to form a new operator Overlap4×1Solution3. This solution is a single-step solution, and thus does not have to repeat any operators. These modifications ensure that the DC gain and DC leakage of Overlap4×1Solution3 are approximately the same as that of the Overlap4×4 operator. However, there are still some small differences due to the rounding effects of the operations outside the scaling stage.

If this Overlap4×1Solution3 operator takes the input $X_1$, the output pixels have the value 1461552, 1461547, 1461540 and 1461535. The ScalingGainRatio is approximately 1.45615435. The DCLeakageRatio is (1461552−1461535)/10^6.

For 8-bit sample images, worst case ScalingGainMismatch is (1.461543−1.45615435)*128/ScalingGainRatio~0.000064/ScalingGainRatio. Worst case DCLeakage is (1461552−1461535)/10^6*128=0.002176/ScalingGainRatio.

For 16-bit sample images, worst case ScalingGainMismatch is 0.000064*256=0.016384/ScalingGainRatio. Worst case DC Leakage is 0.002176*256=0.557056/ScalingGainRatio<½.

For example, in one prior implementation, overlap post filtering for edge 4×1 blocks of samples used the operations shown in the following table.

```
OverlapPostFilter4(a,b,c,d) {
    a += d;
    b += c;
    d -= ((a + 1) >> 1);
    c -= ((b + 1) >> 1);
    InvRotate(c, d);
    d += ((a + 1) >> 1);
    c += ((b + 1) >> 1);
    a -= d - ((d * 3 + 16) >> 5);
    b -= c - ((c * 3 + 16) >> 5);
    d += ((a * 3 + 8) >> 4);
    c += ((b * 3 + 8) >> 4);
    a += ((d * 3 + 16) >> 5);
    b += ((c * 3 + 16) >> 5);
}
```

Following solution 3 for an overlap 4×1 edge operator, changes to scaling are made as shown in the following table.

```
OverlapPostFilter4(a,b,c,d) {
    a += d;
    b += c;
    d -= ((a + 1) >> 1);
    c -= ((b + 1) >> 1);
```

-continued

```
        InvScale(a, d);
        InvScale(b, c);
        a += ((d * 3 + 4) >> 3);
        b += ((c * 3 + 4) >> 3);
        d -= (a >> 1);
        c -= (b >> 1);
        a += d;
        b += c;
        d *= -1;
        c *= -1;
        InvRotate(c, d);
        d += ((a + 1) >> 1);
        c += ((b + 1) >> 1);
        a -= d;
        b -= c;
    }
``` where InvScale( ) and InvRotate( ) are defined as follows.

```
    InvScale(a,b) {
        a += b;
        b = (a >> 1) - b;
        a += (b * 3 + 0) >> 3;
        b += ((a * 3 + 0) >> 4;
        b += (a >> 7);
        b -= (a >> 10);
    }
    InvRotate(a,b) {
        a -= ((b + 1) >> 1);
        b += ((a + 1) >> 1);
    }
```

Replacing the old scaling stage of the Overlap4×1 operator with the new scaling stage increases the complexity by two extra scaling steps. This roughly increases the complexity to 1.2× the complexity of the prior Overlap4×1 operator for the edges.

3.6 Solutions for CornerOverlap2×2 Operator

Two possible solutions are presented for the CornerOverlap2×2 operator.

Solution 1 for CornerOverlap2×2 Operator. Solution 1 is to develop new Overlap6×1 operators for the corners, merging the corner pixels with the adjacent edge pixels. One reason this solution is undesirable is because it involves an intricate design to eliminate DC gain mismatch and DC leakage. Additionally, if the orientation of these operators is horizontal, then images width is less than 3 macroblocks, then this solution breaks down. Similarly, if the orientation of these operators is vertical, then 4:2:0 images with less than 3 macroblocks of height and 4:2:2 images with less than 2 macroblocks height do not work with this solution.

Solution 2 for CornerOverlap2×2 Operator. Solution 2 to is to apply the same Overlap4×1 operator applied to the edges to the corner pixels in a raster scan order. Since both operators work on 4 pixels, this solution has the advantage that the corner operator would have the exact same DC gain mismatch and DC leakage properties as the edge operator This solution is denoted as: CornerOverlap2×2(a,b,c,d)= Overlap4×1AppliedSolution(Top Left, Top Right, Bottom Left, Bottom Right)

In a specific implementation the CornerOverlap2×2 operator is applied with the same pixel ordering for every corner. This has the advantage of allowing for uniform implementation across all corners. The disadvantage of this implementation is that rotations may introduce some small error. With Overlap4×1 Solution3, the error will be only in rounding. Alternatively, a rotated ordering could be used at each corner.

3.7 Solutions for Overlap2×2 Operator for Chroma

The main problem with the Overlap2×2 operator in prior implementations is DC leakage. In this section, a redesign of the scaling stage of this operator is presented so that the DC leakage is reduced. In the following section, the Overlap2×1 and CornerOverlap2×1 operators are redesigned to gain-match this new Overlap2×2 operator.

DC Leakage of this new Overlap2×2 operator at the decoder can be estimated by setting all the inputs to this operator to the same value. If the input to the inverse Overlap2×2 operator are all the same value, the effect of this operator on a pair of input values can be represented as:

$$\begin{bmatrix} 1 & 0 \\ x & 1 \end{bmatrix}\begin{bmatrix} 1 & y \\ 0 & 1 \end{bmatrix}\begin{bmatrix} 1 & 0 \\ x & 1 \end{bmatrix} = \begin{bmatrix} 1+xy & y \\ x(2+xy) & 1+xy \end{bmatrix}.$$

For no DC leakage, the condition is that:

$1xy+y=x(2+xy)+1+xy$, where solving for y yields:

$y=x(2+xy)$, then $$y = 2 * \frac{x}{1-x^2}.$$

The amount of DC leakage can be quantified as:

$y-x(2+xy)$.

The prior Overlap2×2 operator sets the value of x=¼ and y=½, and hence the outputs are (1+xy+y)=13/8 and (x(2+xy)+1+xy)=53/32, and this difference is the reason for DC leakage which is 1/32. The complexity of the prior Overlap2×2 operator for chroma is small as the values of x and y are amenable to implementation using very simple dyadic lifting steps.

While the general solution can vary both x and y so as to mitigate DC leakage, these solutions typically have greater complexity than the prior Overlap2×2 operator for chroma. Therefore, a solution has been developed that reduces DC leakage while limiting the increase in complexity.

In one possible solution, the value of x=¼ is retained and value of y is adjusted so that DC leakage is reduced. Note that lifting using y occurs, and hence this solution would have smaller complexity as compared to solutions that varied x while retaining the existing value of y.

Solution 1 Overlap2×2 Operator for Chroma. The value of y that eliminates DC leakage is y=2*(¼)/(1−1/16)=8/15. DC leakage in this solution is zero. However, y=8/15 cannot be implemented using dyadic lifting steps. Hence this solution has higher complexity since it needs a divide operation.

Solution 2a Overlap2×2 Operator for Chroma. Set the value to y=17/32, and this solution can be implemented (without multipliers) using dyadic lifting steps as ½+1/32. This value has DC leakage of 1/512.

Solution 2b Overlap2×2 Operator for Chroma. Set the value of y to 273/512. This solution can be implemented (without multipliers) using dyadic lifting steps as ½+1/32+1/512. The value of DC leakage is 1/8192.

Solution 2c Overlap2×2 Operator for Chroma. Set the value of y to 4369/8192. This solution can be implemented (without multipliers) using dyadic lifting steps as ½+1/32+1/512+1/8192. The value of DC leakage is 1/131072, i.e., $1/(2^{17})$.

Note that x=½+x/16.

Thus, DC leakage has been reduced from 1/32(0.03125) to 1/(2^17). Thus, DC leakage is reduced to below 16-bit precision. The DC scaling gain ratio in this case is 1+xy+y=54613/32768~1.666656494.

For example, in one prior implementation, overlap post filtering for interior 2×2 blocks of chroma samples used the operations shown in the following table.

```
OverlapPostFilter2x2(a,b,c,d) {
    a += d;
    b += c;
    d -= ((a + 1) >> 1);
    c -= ((b + 1) >> 1);
    b += ((a + 2) >> 2);
    a += ((b + 1) >> 1);
    b += ((a + 2) >> 2);
    d += ((a + 1) >> 1);
    c += ((b + 1) >> 1);
    a -= d;
    b -= c;
}
```

Following solution 2c for an overlap 2×2 operator for chroma, dyadic lifting operations with factors of 1/32, 1/512 and 1/8192 are added, as shown in the following table. Left shifts (>>) by 5, 9 and 13 bits correspond to division by 32, 512 and 8192, respectively.

```
OverlapPostFilter2x2(a,b,c,d) {
    a += d;
    b += c;
    d -= ((a + 1) >> 1);
    c -= ((b + 1) >> 1);
    b += ((a + 2) >> 2);
    a += ((b + 1) >> 1);
    a += (b >> 5);
    a += (b >> 9);
    a += (b >> 13);
    b += ((a + 2) >> 2);
    d += ((a + 1) >> 1);
    c += ((b + 1) >> 1);
    a -= d;
    b -= c;
}
```

3.8 Solutions for Overlap2×1 Operator

Similar to the solutions for the Overlap4×1 operator, 3 solutions are presented for the Overlap2×1 operator, where one of the solutions has multiple variants.

Solution 1 for Overlap2×1 Operator. Since the DC gain of the prior Overlap2×1 operator is roughly the square root of the DC gain of the prior Overlap2×2 operator, the first solution is to apply the prior Overlap2×1 operator twice. Overlap2×1Solution1(a,b) is specified as:
3. Overlap2×1(a,b);
4. Overlap2×1(b,a).
By reversing the order between the two applications of the operator, the DC leakage introduced by the first stage is cancelled by the second stage. Repeating the ordering would induce the leakage to accumulate. Unfortunately, this solution still suffers from significant DC gain mismatch. In terms of complexity, this solution has roughly twice the complexity of the prior Overlap2×1 operator.

Solution 2 for Overlap2×1 Operator. Solution 2 is similar in spirit to solution 1 for the Overlap2×1 operator—it involves the application of a single operator to the same samples twice. For this solution though, the scaling of the prior Overlap2×1 operator is altered by adding additional lifting steps. As before, Overlap2×1Solution2(a,b) is specified as:
3. Overlap2×1Altered(a,b);
4. Overlap2×1Altered(b,a).

The idea behind this solution 2 for the Overlap2×1 operator is to change x and y so that both DC leakage and DC scaling gain mismatch are minimized. The condition for minimizing DC leakage is as follows $$1+xy+x(2+xy)=y+1+xy.$$

Solving for y yields $$y = \left(\frac{2x}{1-x^2}\right).$$

In this case, the ScalingGainRatio of one stage of the Overlap2×1Altered operator can be computed:

$$y+1+xy = y(1+x)+1 = \frac{2x}{1-x}+1 = \frac{1+x}{1-x}.$$

Let the square root of the gain of the Overlap2×2 operator be denoted as k. Therefore, the value of x that minimizes DC Scaling Gain mismatch is given by $$\frac{1+x}{1-x} = k.$$

Or:

$$\frac{k-1}{k+1} = x.$$

Once, the value of x is determined that minimizes ScalingGainMismatch using this equation, the value of y (that minimizes DC leakage) can be determined using the earlier equation $$y = \left(\frac{2x}{1-x^2}\right).$$

In this case, the ScalingGainRatio of the Overlap4×4 operator≅1.666656494. Therefore, the value of k≅sqrt (1.666656494)≅1.290990509, and the DC scaling gain must approximate this value to minimize DC ScalingGainMismatch. Therefore, the value of x must approximate 0.127015153 and the value of y should be chosen according to the earlier equation.

In practice, x can be approximated by a value that can be implemented using dyadic lifting steps; the value of y can be selected, and then y can be approximated by a value that can be implemented using dyadic lifting steps. For this operator, empirical results show that the objective of minimizing DC leakage is more important than the objective of minimizing DC ScalingGainMismatch. Therefore, the approximation of y for a given value of x should be much more accurate than the initial approximation of x.

Solution 2a for Overlap2×1 Operator. Choose x=⅛ and y=65/256=¼+1/256. This solution has minimal DC leakage. The DC scaling gain of this solution is:

$$\frac{1+x}{1-x} = 1.285714286.$$

Therefore, this solution still has a small amount of DC ScalingGainMismatch. There are no additional lifting steps for implementing x as compared to the prior Overlap2×1 operator. The implementation of y uses one additional lifting step as compared to the prior Overlap2×1 operator.

Solution 2b for Overlap2×1 Operator. Choose $x=65/512=1/8+1/512$ and $y=33/128=1/4+1/128$. This solution has minimal DC leakage. The DC scaling gain of this solution is:

$$\frac{1+x}{1-x} = 1.29082774.$$

Therefore, this solution still has a small amount of ScalingGainMismatch, but smaller than Solution 2a for the Overlap2×1 operator. There is one additional lifting step for implementing x as compared to the prior Overlap2×1 operator. The implementation of y calls for one additional lifting step as compared to the prior Overlap2×1 operator. Since the scaling stage calls for x to applied twice, and y to be applied once, there are 3 extra lifting steps in the new solution 2b for the Overlap2×1 operator.

Solution 2c for Overlap2×1 Operator. Choose $x=2081/16384$ and $y=33/128$. The DC scaling gain of this solution is $$\frac{1+x}{1-x} = 1.290987905.$$

Therefore, this solution has a minimal amount of DC ScalingGainMismatch. There are two extra lifting steps in implementing x. There is one extra lifting steps in implementing y. Since the scaling stage calls for x to applied twice, and y to be applied once, there are 5 extra lifting steps in the new solution 2b for the Overlap2×1 operator. In terms of complexity, the five additional lifting steps in Overlap2×1Altered make its complexity 1.5 times larger than the prior Overlap2×1 operator. Thus, the overall solution Overlap2×1Solution2 has roughly 3 times the complexity of the prior Overlap2×1 operator.

Solution 3 for Overlap2×1 Operator. In this solution, the scaling stage of the prior Overlap2×1 operator is replaced by the scaling stage of the prior Overlap2×2 operator to form a new operator Overlap2×1Solution3. This solution is a single-step solution, and thus does not have to repeat any operators. These modifications ensure that the DC gain and DC leakage of Overlap2×1Solution3 are approximately the same as that of the Overlap2×2 operator. However, there are still some small differences due to the rounding effects of the operations outside the scaling stage.

For example, in one prior implementation, overlap post filtering for edge 2×1 blocks of chroma samples used the operations shown in the following table.

```
OverlapPostFilter2(a,b) {
    b += ((a + 4) >> 3);
    a += ((b + 2) >> 2);
    b += ((a + 4) >> 3);
}
```

Following solution 3 for an overlap 2×1 operator for chroma, dyadic lifting operations with factors of 1/32, 1/512 and 1/8192 are added, as shown in the following table. Left shifts (>>) by 5, 9 and 13 bits correspond to division by 32, 512 and 8192, respectively.

```
OverlapPostFilter2(a,b) {
    b += ((a + 2) >> 2);
    a += ((b + 1) >> 1);
    a += (b >> 5);
    a += (b >> 9);
    a += (b >> 13);
    b += ((a + 2) >> 2);
}
```

Replacing the old scaling stage of the Overlap2×1 operator with the new scaling stage increases the complexity by three extra scaling steps. This roughly increases the complexity to 1.2× the complexity of the prior Overlap2×1 operator for the edges.

3.9 Solutions for CornerOverlap1×1 Operator

The CornerOverlap1×1 operator presents a particular design challenge, since it operates only on a single sample. DC leakage is thus not an issue while DC gain mismatch is a significant problem. Several possible solutions are described below.

Strictly speaking, the CornerOverlap1×1 operator is not an operator in the same sense as the other overlap operators. A "1×1" operator would have no region of support outside the single sample. On the other hand, many of the example 1×1 operator solutions below involve prediction between the single sample and a predictor that is determined from at least one sample outside the 1×1 area. For the sake of simplicity, these corner operators are termed corner overlap 1×1 operators.

DC scaling is another way that many of the example 1×1 operator solutions presented below differ from other overlap operators. For the preceding 4×4, 4×1, 2×2 and 2×1 operators, scaling directly results from the overlap operations. The sample prediction operations described below for some example CornerOverlap1×1 operators do not cause scaling in the same way. Although this could potentially lead away from the goal of having the same DC gain for all operators in a set, in practice similar scaling results most of the time for such 1×1 corner operators, as explained below.

Solution 1 for CornerOverlap1×1 Operator. Similar to solution 1 for the CornerOverlap2×2 operator, one solution is to design a new Overlap3×1 operator. This solution has similar disadvantages. This solution suffers from both a minimum image size requirement (3 macroblocks along the direction of the operator) in addition to the likelihood of additional DC gain mismatch and DC leakage issues.

Solution 2 for CornerOverlap1×1 Operator. For this solution, the fact that the corner sample is likely to be highly correlated to its adjacent samples is leveraged. Importantly, considering its use in overlap processing of DC coefficients, this operator works over the mean of each of the original image blocks. Thus, prior to the 1×1 corner overlap operator, the values of the corner sample and its adjacent samples have a high probability of being similar. If DC gain mismatch is eliminated, then the corner sample value would be very similar to its adjacent samples after the overlap transformation as well.

Therefore, this solution uses a scheme based on prediction of the corner samples. Consider the top left corner as an example and label the samples as follows:

A B ....
C D ....
....

The top left sample is labeled A, the sample one to the right of A is labeled B, and the sample one below A is labeled C. The prediction scheme is implemented as follows, assuming in-place calculations are used.
 1. Before second stage overlap operators are applied:
  a. value(A)=value(A)−(value(B)+value(C)+1)>>1.
 2. After second stage overlap operators are applied:
  a. value(A)=value(A)+(value(B)+value(C)+1)>>1.

Since the residual value of A after step 1 is likely to be small, this operation is roughly equivalent to applying the same gain to the corner sample. (Whereas B and C may have significant values, the difference value A is typically zero or close to zero. After step 1, scaling is applied to the adjacent B and C samples (e.g., through application of edge overlap operators). When the scaled B and C values are added back to the difference value A in step 2, the resulting value A has, in most cases, effectively been scaled to the same extent as the B and C values.) Application of this solution to the other three corners is straightforward.

Solution 2 for the CornerOverlap1×1 operator has the advantage of being symmetric with respect to rotations. One disadvantage is that this solution requires the image have at least a 2 macroblock width and a 2 macroblock height (only for 4:2:0, not 4:2:2) or else the prediction scheme becomes impractical.

Solution 3 for CornerOverlap1×1 Operator. A second scheme similar to that of Solution 2 is presented for the CornerOverlap1×1 operator. Some implementations may not perform each stage of the overlap transform at a single time, instead staggering the stages. This can make it difficult to access both B and C simultaneously, before or after overlap transformation. The following scheme is presented for this solution:
 1. Before second stage overlap operators are applied to B:
  a. value(A)=value(A)−value(B)>>1.
 2. Before second stage overlap operators are applied to C:
  a. value(A)=value(A)−value(C)>>1.
 3. After second stage overlap operators are applied to B:
  a. value(A)=value(A)+value(B)>>1.
 4. After second stage overlap operators are applied to C:
  a. value(A)=value(A)+value(C)>>1.

The ordering of steps is only required to have 1 occur before 3 and 2 occur before 4. So long as these two conditions are met, any reordering is acceptable. Solution 3 for the Corner-Overlap1×1 operator allows decoupling from timing issues in various implementations. Unfortunately, this solution may have some issues with rounding not present in Solution 2. Otherwise, this solution shares the same properties as Solution 2 for the CornerOverlap1×1 operator.

Solution 4 for CornerOverlap1×1 Operator. In this solution, solution 3 is modified to operate over only the horizontal direction, as follows:
 1. Before second stage overlap operators are applied to B:
  a. value(A)=value(A)−value(B).
 2. After second stage overlap operators are applied to B:
  a. value(A)=value(A)+value(B).

The advantage of this solution is that it involves fewer memory accesses. Since it interacts with half as many samples as solutions 2 and 3 for the CornerOverlap1×1 operator, the complexity is lower. The disadvantage of this solution is that it lacks symmetry and thus has issues with rotations. This concern is mitigated when considering that the downsampling introduces greater loss than the asymmetry does. As with the other solutions for the CornerOverlap1×1 operator, in solution 4 the image (or hard tile) has a width of at least 2 macroblocks. One advantage though is that all downsampled chroma operations are similar. Similar to solution 2 (and solutions 3, 5, 6 and 7), the adjacent sample used to compute the difference for A is expected to have a very similar value to A. After step 1, the adjacent sample is scaled as part of edge overlap processing, and then added back to the difference A for the corner in step 2. Since the difference A is expected to be zero or close to zero, the corner value is scaled to roughly the same extent as the adjacent sample.

Solution 5 for CornerOverlap1×1 Operator. In this solution, solution 3 is modified to operate over only the vertical direction, as follows:
 1. Before second stage overlap operators are applied to C:
  a. value(A)=value(A)−value(C).
 2. After second stage overlap operators are applied to C:
  a. value(A)=value(A)+value(C).

The advantage of this solution is that it involves fewer memory accesses. Since it interacts with half as many samples as solutions 2 and 3 for the CornerOverlap1×1 operator, the complexity is lower. Like solution 4, the disadvantage of this solution is that it lacks symmetry and thus has issues with rotations. This concern is mitigated when considering that the downsampling introduces greater loss than the asymmetry does. As with the other solutions for the CornerOverlap1×1 operator, in solution 5 4:2:0 images have a height of at least 2 macroblocks. No other size requirements arise from this solution. Thus 4:2:0 and 4:2:2 operations are not parallel, another disadvantage of this solution.

Solution 6 for CornerOverlap1×1 Operator. This solution for the CornerOverlap1×1 operator is a combination of solutions 4 and 5. Specifically, a syntax element is added to the bitstream to specify whether prediction is horizontal or vertical for the CornerOverlap1×1 operator. This solution has the advantage that rotations are simply supported. The addition of a syntax element is a disadvantage of this solution.

Solution 7 for CornerOverlap1×1 Operator. This final solution is similar to solution 4, except that instead of the value of B being used as a predictor for A the value of D is used as the predictor. A benefit of using D as a predictor is rotational symmetry. However, a disadvantage of using D is that it may be a worse match than B or C.

4. Computing Environment

The above described overlap processing innovations can be implemented on any of a variety of devices (e.g., digital media encoding and/or decoding devices) in which digital media signal processing is performed, including among other examples, computers, image and video recording, transmission and receiving equipment, portable video players, digital media players, video conferencing, etc. The overlap processing innovations can be implemented in hardware circuitry, as well as in digital media processing software executing within a computer or other computing environment, such as shown in FIG. 8.

Figure 8:
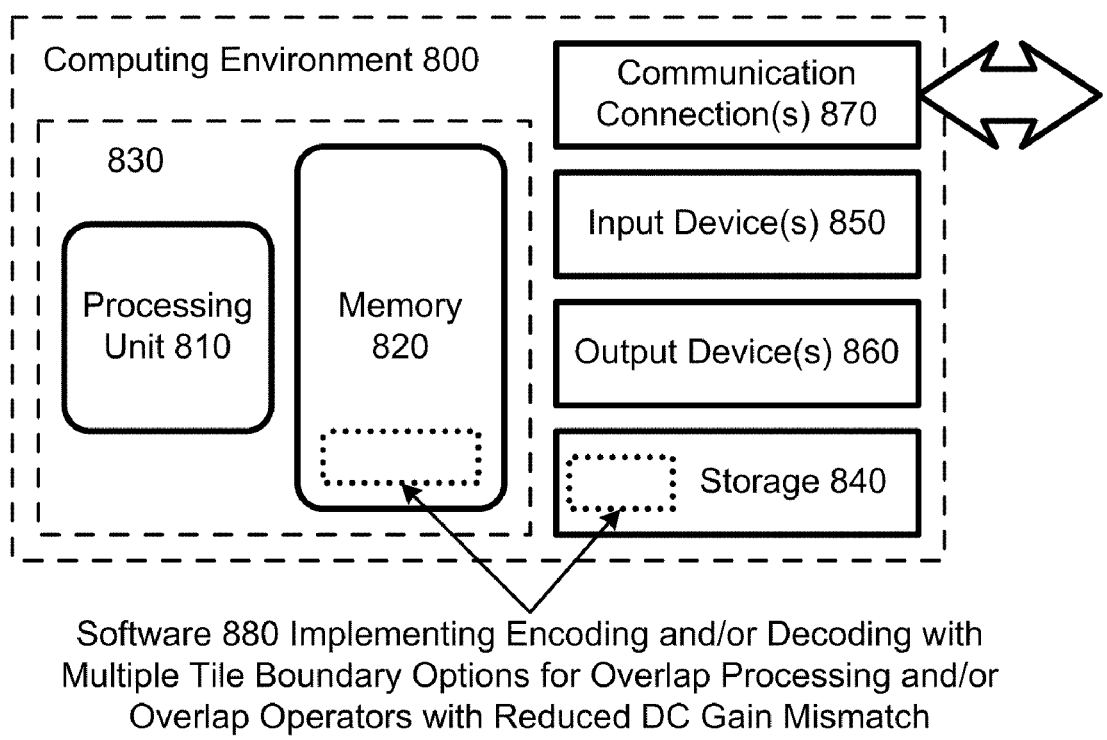
FIG. 8 is a block diagram of a suitable computing environment for implementing the technologies described herein.

FIG. 8 illustrates a generalized example of a suitable computing environment (800) in which described embodiments may be implemented. The computing environment (800) is not intended to suggest any limitation as to scope of use or functionality of the invention, as the present invention may be implemented in diverse general-purpose or special-purpose computing environments.

With reference to FIG. 8, the computing environment (800) includes at least one processing unit (810) and memory unit (820). In FIG. 8, this most basic configuration (830) is included within a dashed line. The processing unit (810)

executes computer-executable instructions and may be a real or a virtual processor. In a multi-processing system, multiple processing units execute computer-executable instructions to increase processing power. The memory (820) may be volatile memory (e.g., registers, cache, RAM), non-volatile memory (e.g., ROM, EEPROM, flash memory, etc.), or some combination of the two. The memory (820) stores software (880) implementing the described encoder/decoder with multiple tile boundary options for overlap processing and/or overlap operators with reduced DC gain mismatch.

A computing environment may have additional features. For example, the computing environment (800) includes storage (840), one or more input devices (850), one or more output devices (860), and one or more communication connections (870). An interconnection mechanism (not shown) such as a bus, controller, or network interconnects the components of the computing environment (800). Typically, operating system software (not shown) provides an operating environment for other software executing in the computing environment (800), and coordinates activities of the components of the computing environment (800).

The storage (840) may be removable or non-removable, and includes magnetic disks, magnetic tapes or cassettes, CD-ROMs, CD-RWs, DVDs, or any other medium which can be used to store information and which can be accessed within the computing environment (800). The storage (840) stores instructions for the software (880) implementing the described encoding/decoding with multiple tile boundary options for overlap processing and/or overlap operators with reduced DC gain mismatch.

The input device(s) (850) may be a touch input device such as a keyboard, mouse, pen, or trackball, a voice input device, a scanning device, or another device that provides input to the computing environment (800). For audio, the input device(s) (850) may be a sound card or similar device that accepts audio input in analog or digital form, or a CD-ROM reader that provides audio samples to the computing environment. For images or video, the input device(s) (850) may be a camera, TV tuner, or other device that provides input video in analog or digital form. The output device(s) (860) may be a display, printer, speaker, CD-writer, or another device that provides output from the computing environment (800).

The communication connection(s) (870) enable communication over a communication medium to another computing entity. The communication medium conveys information such as compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available tangible media that can be accessed within a computing environment. By way of example, and not limitation, with the computing environment (800), computer-readable media include memory (820) and storage (840), and combinations of the two. Computer-readable media is tangible media. Computer-readable media does not include a modulated data signal.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

Having described and illustrated the principles of our innovations in the detailed description and accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of performing an inverse overlap transform used to decode digital media using a digital media decoding device, the method comprising:
   with the digital media decoding device, performing an inverse frequency transformation on digital media; and
   with the digital media decoding device, applying a plurality of overlap operators to results of the inverse frequency transformation, the plurality of overlap operators including at least a first overlap operator and a second overlap operator, wherein the first overlap operator is an interior overlap operator, and wherein the second overlap operator is an edge or corner overlap operator, each of the plurality of overlap operators being characterized by substantially equivalent DC gain.

2. The method of claim 1 wherein, as part of the applying:
   the first overlap operator is applied to an interior 4×4 region of samples of an image and/or tile;
   the second overlap operator is an edge overlap operator applied to an edge 4×1 region of samples of the image and/or tile; and
   a third overlap operator of the plurality of overlap operators is applied to a corner 2×2 region of samples of the image and/or tile.

3. The method of claim 2 wherein the first overlap operator includes a scaling stage, and wherein the second overlap operator uses the scaling stage of the first overlap operator.

4. The method of claim 2 wherein the inverse overlap transform is a hierarchical inverse transform having multiple stages, and wherein the first, second, and third overlap operators are applied to samples of at least one channel in a first stage of the multiple stages.

5. The method of claim 2 wherein the inverse overlap transform is a hierarchical inverse transform having multiple stages, and wherein the first, second, and third overlap operators are applied to samples of each of plural full resolution channels in a second stage of the multiple stages.

6. The method of claim 2, wherein the first overlap operator includes first scaling with a given scaling stage, wherein the second overlap operator includes second scaling with the given scaling stage, and wherein the given scaling stage is:

```
a += b;
b = (a >> 1) − b;
a += (b * 3 + 0) >> 3;
b += ((a * 3 + 0) >> 4;
b += (a >> 7);
b −= (a >> 10); .
```

7. The method of claim 2 wherein the third overlap operator applied to the corner 2×2 region of samples is applied using the second overlap operator after reordering the top-left, top-right, bottom-left, and bottom-right samples of the corner 2×2 region of samples as an intermediate 4×1 region of samples.

8. The method of claim 1 wherein the inverse overlap transform is a hierarchical inverse transform having multiple stages, wherein, as part of the applying:
the first overlap operator is applied to an interior 2×2 region of samples of an image and/or tile;
the second overlap operator is an edge overlap operator applied to an edge 2×1 region of samples of the image and/or tile; and
a third overlap operator of the plurality of overlap operators is applied to a corner 1×1 region of samples of the image and/or tile; and
wherein the first, second, and third overlap operators are applied in a first stage of the multiple stages to samples of downsampled chroma channels.

9. The method of claim 8 wherein the first overlap operator and the second overlap operator include dyadic lifting steps with factors of $$\frac{1}{32}, \frac{1}{512} \text{ and } \frac{1}{8192}.$$

10. The method of claim 8 wherein the third overlap operator is applied to a sample value at location A using a sample value at a horizontally adjacent location B, and wherein the third overlap operator is implemented by:
before overlap operators are applied to the sample value at location B, adjusting the sample value at location A by subtracting the sample value at location B from the sample value at location A; and
after overlap operators have been applied to the sample value at location B, adjusting the sample value at location A by adding the sample value at location B to the sample value at location A.

11. A digital media decoder comprising:
a memory unit for storing digital media data to be decoded; and
a processing unit programmed to:
perform an inverse frequency transformation on digital media; and
apply a plurality of overlap operators to results of the inverse frequency transformation, the plurality of overlap operators including at least a first overlap operator and a second overlap operator, wherein the first overlap operator is an interior overlap operator, and wherein the second overlap operator is an edge or corner overlap operator, each of the plurality of overlap operators being characterized by substantially equivalent DC gain.

12. The digital media decoder of claim 11, wherein:
the first overlap operator is adapted to be applied to an interior 4×4 region of samples of an image and/or tile;
the second overlap operator is an edge overlap operator adapted to be applied to an edge 4×1 region of samples of the image and/or tile; and
a third overlap operator of the plurality of overlap operators is adapted to be applied to a corner 2×2 region of samples of the image and/or tile;
wherein the first, second, and third overlap operators are applied to samples of at least one full resolution channel.

13. The digital media decoder of claim 12, wherein the first overlap operator includes first scaling with a given scaling stage, wherein the second overlap operator includes second scaling with the given scaling stage, and wherein the given scaling stage is:

```
a += b;
b = (a >> 1) − b;
a += (b * 3 + 0) >> 3;
b += ((a * 3 + 0) >> 4;
b += (a >> 7);
b −= (a >> 10); .
```

14. The digital media decoder of claim 11, wherein:
the first overlap operator is adapted to be applied to an interior 2×2 region of samples of an image and/or tile;
the second overlap operator is an edge overlap operator adapted to be applied to an edge 2×1 region of samples of the image and/or tile; and
a third overlap operator of the plurality of overlap operators is adapted to be applied to a corner 1×1 region of samples of the image and/or tile;
wherein the first, second, and third overlap operators are applied to samples of downsampled chroma channels in a first stage of a hierarchical inverse transform having multiple stages.

15. The digital media decoder of claim 14, wherein the first overlap operator and the second overlap operator include dyadic lifting steps with factors of $$\frac{1}{32}, \frac{1}{512} \text{ and } \frac{1}{8192}.$$

16. A method of decoding digital media using a digital media decoding device, the method comprising:
with the digital media decoding device:
receiving, in an encoded bitstream, information indicating a selected tile boundary option, wherein the selected tile boundary option indicates one of a hard tile boundary processing for overlap operators and a soft tile boundary processing for overlap operators;
based at least in part on the selected tile boundary option, performing inverse overlap processing.

17. The method of claim 16 further comprising:
when the selected tile boundary option indicates the soft tile boundary processing for overlap operators, performing the inverse overlap processing with inverse overlap operations across tile boundaries; and
when the selected tile boundary option indicates the hard tile boundary processing for overlap operators, performing the inverse overlap processing without inverse overlap operations across tile boundaries, wherein the inverse overlap processing still includes inverse overlap operations on edge samples on at least one side of the respective tile boundaries so as to reduce DC gain mismatch.

18. The method of claim 16 wherein the selected tile boundary option is signaled in an image header.

19. The method of claim 16 wherein:

when the selected tile boundary option indicates the soft tile boundary processing for overlap operators, the inverse overlap processing for a current tile includes at least partially decoding at least one spatially-neighboring tile; and when the selected tile boundary option indicates the hard tile boundary processing for overlap operators, the inverse overlap processing for the current tile is independent of decoding spatially-neighboring tiles.

20. The method of claim 16 wherein the selected tile boundary option is received in the encoded bitstream as a separate syntax element encoded as a single bit.

* * * * *